United States Patent
Jiang

(10) Patent No.: US 12,308,778 B2
(45) Date of Patent: May 20, 2025

(54) MOTOR ASSEMBLY FOR SLOWING DOWN FALLING SPEED OF STAGE LIGHT FIXTURE ON POWER FAILURE, AND STAGE LIGHT FIXTURE

(71) Applicant: Guangzhou Haoyang Electronic Co., Ltd., Guangzhou (CN)

(72) Inventor: Weikai Jiang, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 131 days.

(21) Appl. No.: 18/091,847

(22) Filed: Dec. 30, 2022

(65) Prior Publication Data
US 2024/0113640 A1 Apr. 4, 2024

(30) Foreign Application Priority Data

Sep. 29, 2022 (CN) .......................... 202211213403.5
Dec. 15, 2022 (CN) .......................... 202223411086.6

(51) Int. Cl.
*H02P 5/46* (2006.01)
*F21V 14/00* (2018.01)
(Continued)

(52) U.S. Cl.
CPC .............. *H02P 3/18* (2013.01); *F21V 14/00* (2013.01); *F21V 21/15* (2013.01); *F21V 25/00* (2013.01); *F21W 2131/406* (2013.01)

(58) Field of Classification Search
CPC .. H02P 1/44; H02P 27/06; H02P 25/04; H02P 27/08; H02P 1/445; H02P 1/42;
(Continued)

(56) References Cited

U.S. PATENT DOCUMENTS 3,618,202 A * 11/1971 Callahan et al. ...... H01G 13/00
156/89.12
5,196,656 A * 3/1993 Mizuno ................ H02H 7/0851
187/314
(Continued)

FOREIGN PATENT DOCUMENTS

CN 201004613 Y 1/2008
CN 103306899 A 9/2013
(Continued)

OTHER PUBLICATIONS

Search report of the parallel European application EP22217369.2 dated Jul. 9, 2023, 12 pages.
(Continued)

*Primary Examiner* — Kawing Chan
*Assistant Examiner* — Charles S Laughlin
(74) *Attorney, Agent, or Firm* — MUNCY, GEISSLER, OLDS & LOWE, P.C.

(57) ABSTRACT

A motor assembly for slowing down falling speed of a stage light fixture on power failure includes a motor driver, an automatic transfer switch, a capacitive load, and an alternating current motor. In the case that the automatic transfer switch is energized, windings of the alternating current motor are kept connected to the motor driver, and in the case that the automatic transfer switch is deenergized, the windings of the alternating current motor are switched to be connected to the capacitive loads. The motor assembly according to the present disclosure can reduce the falling speed of the stage light fixture in case of the power failure.

20 Claims, 10 Drawing Sheets

(51) Int. Cl.
*F21V 21/15* (2006.01)
*F21V 25/00* (2006.01)
*H02P 3/18* (2006.01)
*H02P 25/10* (2006.01)
*F21W 131/406* (2006.01)

(58) Field of Classification Search
CPC .... H02P 7/29; H02P 5/74; H02P 21/22; H02P 6/08; H02P 23/24; H02P 29/0241; H02P 2207/01; H02P 29/50; H02P 6/14; H02P 25/22; H02P 6/182; H02P 25/092; H02P 3/22; H02P 3/18; H02P 2201/03; H02P 25/18; H02P 27/16; H02P 23/26; H02P 29/032; H02P 6/085; H02P 2201/07; H02P 2209/07; H02P 25/14; H02P 1/26; H02P 25/16; H02P 3/24; H02P 6/16; H02P 2207/05; H02P 25/08; H02P 31/00; H02P 7/04; H02P 1/265; H02P 2209/01; H02P 25/24; H02P 3/12; H02P 29/024; H02P 6/34; H02P 7/2913; H02P 2201/09; H02P 21/00; H02P 29/02; H02P 29/027; H02P 29/028; H02P 4/00; H02P 6/26; H02P 25/024; H02P 25/032; H02P 6/12; H02P 1/426; H02P 23/14; H02P 23/28; H02P 27/085; H02P 29/62; H02P 6/10; H02P 6/18; H02P 6/20; H02P 7/295; H02M 7/4837

See application file for complete search history.

(56) References Cited

U.S. PATENT DOCUMENTS

| | | | |
|---|---|---|---|
| 5,218,283 A * | 6/1993 | Wills | H02P 25/04 |
| | | | 318/123 |
| 10,274,175 B1 * | 4/2019 | Wood | G01D 5/145 |
| 2007/0145937 A1 | 6/2007 | Hansen | |
| 2010/0066282 A1 | 3/2010 | Falk et al. | |

FOREIGN PATENT DOCUMENTS

| | | |
|---|---|---|
| CN | 108886334 A | 11/2018 |
| EP | 1520829 A1 | 4/2005 |

OTHER PUBLICATIONS

Chinese Examination Report for application CN202211213403.5 dated Aug. 23, 2024, 11 pages.

* cited by examiner

MOTOR ASSEMBLY FOR SLOWING DOWN FALLING SPEED OF STAGE LIGHT FIXTURE ON POWER FAILURE, AND STAGE LIGHT FIXTURE

CROSS REFERENCE TO RELATED APPLICATIONS

The present application claims priorities from Chinese Patent Application No. 202211213403.5 filed on Sep. 29, 2022, and 202223411086.6 filed on Dec. 15, 2022, all of which are hereby incorporated herein by reference.

TECHNICAL FIELD

The present disclosure relates to power electronics, and in particular, relates to a motor assembly for slowing down falling speed of a stage light fixture on power failure, and a stage light fixture.

BACKGROUND

A light head of a stage light fixture is usually provided with components such as a focus lens, a magnify lens and the like that are movable along an optical path, components such as a frosting lens, a prism and the like that are swingable with respect to the optical path, and components such as a rotary pattern wheel, a fixed pattern wheel, a color wheel, a shader and the like that are rotatable with respect to the optical path. In addition, the light head and the support arm of the stage light fixture are also rotatable. When these components remain stationary, a motor driver outputs a braking current, and a stepper motor thus generates a braking torque to maintain the components stationary. While in case of the stage light fixture on power failure, since the motor driver losses power supply, the motor will have no braking current or breaking force, so that the components will fall down due to downward gravity acceleration. As well known, when the components fall to the lowest position at a high speed, a huge impact force may be generated, which may cause deformation and even damage of the components.

In the related arts, collision buffering is generally implemented by using a brake motor to avoid damages. In such configuration, in case of a power failure, a rotary shaft of a motor unit is braked by a brake pad of a brake unit, However, this braking method increases the thickness of the motor along the direction of the rotary shaft and is more expensive than a common motor. Further, the brake pad will be worn after long-term operation, thereby reducing braking force and affecting the buffering effects.

In another way, two pairs of windings of a two-phase stepper motor are respectively short-circuited via a relay when on power failure, and the motor is driven to rotate by falling of the components, so that the motor generates an induced current formed by an induced electromotive force to generate a braking force, the component thus may not fall quickly. This way achieves braking using short circuit of the motor, but the braking torque generated is small. When the component is heavy, the braking torque generated will be less than the gravity of the component, in such situation the component may still fall quickly.

SUMMARY

In view of this, the present disclosure thus provides a motor assembly for slowing down falling speed of a stage light fixture on power failure, and a stage light fixture, which can effectively reduce the fall speed of the stage light fixture in case of power failure.

On the one hand, a motor assembly for slowing down falling speed of a stage light fixture on power failure is provided according to the present disclosure. The motor assembly includes a motor driver, an automatic transfer switch, a capacitive load, and an alternating current motor. In the case that the automatic transfer switch is energized, windings of the alternating current motor are kept connected to the motor driver, and in the case that the automatic transfer switch is deenergized, the windings of the alternating current motor are switched to be connected to the capacitive load.

On the other hand, a stage light fixture is further provided according to the present disclosure. The stage light fixture includes the motor assembly for slowing down falling speed of the stage light fixture in case of the power failure mentioned above.

According to the present invention, the energization and deenergization are controlled by an automatic transfer switch in the motor assembly, such that the motor driver is connected to the windings of the motor in response to be energized and is connected to the capacitive load in response to deenergized. When deenergized, the capacitive load makes the phase of the induced current 90° ahead of the phase of the induced voltage, so that the directions of the electromotive forces generated by the armature magnetic field of the motor and the primary magnetic field of the permanent magnet are consistent, and a longitudinal magnetization armature reaction thus may be generated. In this case, the magnetic flux increases, the induced voltage rises, the induced current rises, and the braking torque thus increases, such that braking of the motor in case of the power failure is achieved, thus slowing down the falling speed of the stage light fixture in case of the power failure.

DETAILED DESCRIPTION

Figure 1:
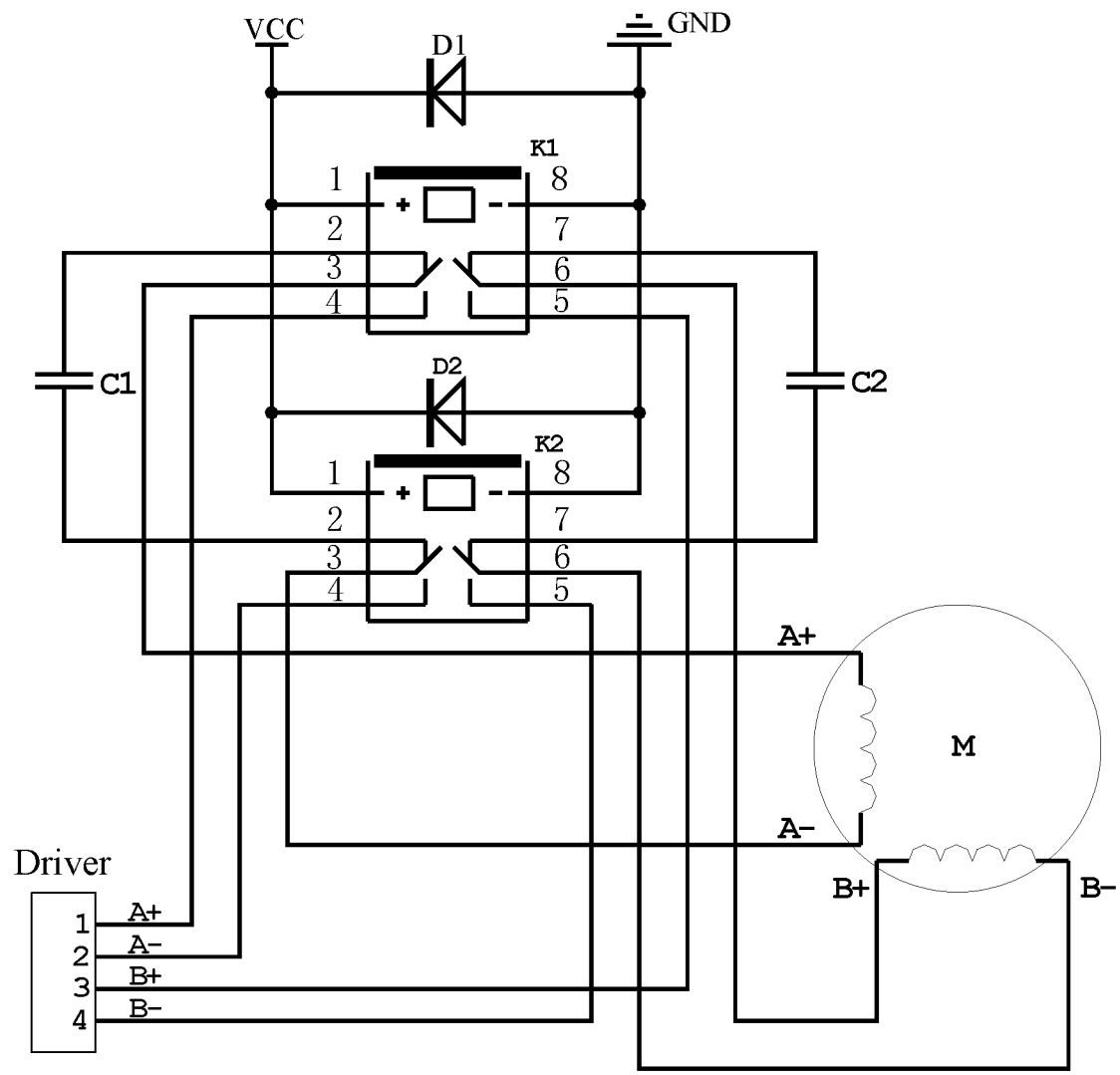
FIG. 1 illustrates a first schematic circuit diagram of a motor assembly for slowing down a falling speed of a stage light fixture on power failure according to the present disclosure.

The accompanying drawings are only for exemplary description, and shall not be construed as limiting the present disclosure. For better illustration of the following embodiments, some parts or components would be omitted, scaled up or scaled down in the drawings, which are not indicative of the practical sizes. For a person skilled in the art, it shall be understandable that some commonly known structures and description thereof are omitted for brevity.

Hereinafter, a motor assembly for slowing down a falling speed of a stage light fixture on power failure, and a stage light fixture are described with reference to FIG. 1 to FIG. 11.

In the normal operation of the stage light fixture according to the embodiments, the components such as a focus lens, a magnify lens and the like are movable along the optical path, the components such as a frosting lens, a prism and the like are swingable with respect to the optical path, and the components such as a rotary pattern wheel, a fixed pattern wheel, a color wheel, a shader and the like are rotatable with respect to the optical path. In addition, a light head and a support arm of the stage light fixture are also rotatable. When these components remain stationary in case of movement, the stepper motor thus generates a braking torque by means of outputting a braking current by the motor driver, such that the components remain stationary. When subjected to a power failure, since the motor driver loses power supply, the motor will have no braking current or braking force, so that the components will fall down under a downward gravity acceleration. When the components fall to the lowest position at a high speed, a huge impact force may be generated, which may cause deformation and even damage of the components. Therefore, in order to slow down the falling speed of the stage light fixture in case of a power failure, when the stage light fixture is subjected to a power failure, the motor assembly, which reduces the falling speed of the stage light fixture in case of a power failure, generates an electromagnetic torque of a braking effect to control the falling speed of the stage light fixture.

According to the embodiments, the motor assembly includes a motor driver, an automatic transfer switch, a capacitive load, and an alternating current motor. In the case that the automatic transfer switch is energized, the windings of the alternating current motor are kept connected to the motor driver; and in the case that the automatic transfer switch is deenergized, the windings of the alternating current motor are switched to be connected to the capacitive load, and the capacitive load is a non-polar capacitor. In this way, in the case that the automatic transfer switch is energized, the winding of the alternating current motor is connected to the motor drive, and the alternating current motor operates normally; and in the case that the automatic transfer switch is deenergized, the winding of the alternating current motor is connected to the capacitive loads. When deenergized, the capacitive load makes the phase of the induced current 90° ahead of the phase of the induced voltage, so that the directions of the electromotive forces generated by the armature magnetic field of the motor and the primary magnetic field of the permanent magnet are consistent, and a longitudinal magnetization armature reaction thus may be generated. In this case, the magnetic flux increases, the induced voltage rises, the induced current rises, and the braking torque thus increases, thereby reducing the falling speed of the stage light fixture in case of the power failure. In addition, the capacitive load is a non-polar capacitor, and within an electric cycle of the alternating current motor, forward and reverse charging may be achieved, which can always accommodate electric charge generated by the alternating current motor.

It should be noted that a plurality of alternating current motors may share one capacitive load, or a plurality of windings of an alternating current motor may be connected in series to connect a capacitive load.

It should be also noted that the automatic transfer switch includes, but is not limited to, a semiconductor switch circuit, and a relay including a direct current relay and an alternating current relay. Alternating current motors include, but are not limited to, stepper motors and servo motors. A maximum amount of electric charge that may be stored in the capacitive load is greater than or equal to a maximum amount of electric charge generated by the alternating current motor within one electric cycle, and the capacitive load may not be fully charged within one electric cycle of the alternating current motor. In this way, the capacitive load may continue to be charged and discharged, and may never be fully charged, which constantly increasing the torque of the alternating current motor, and continuously reducing the falling speed of the stage light fixture in case of the power failure. According to the embodiments, a capacitance of the capacitive load (a non-polar capacitor) is greater than or equal to 40 μF (microfarad). The capacitance of the capacitive load may be preferably 70 μf, such that it is ensured that the AC motor is smoothly braked without jamming or incoherent motion in case of the power failure.

In one aspect, when the automatic transfer switch includes a normally opened terminal, a normally closed terminal, and a common terminal, on or off of the automatic transfer switch is controlled by a control signal or is at the normally closed terminal or the normally opened terminal due to energization or deenergization, and the winding is a set of turns constituting an electrical line corresponding to a voltage of a transformer. The common terminal of the automatic transfer switch is connected to the winding of the alternating current motor, the normally closed terminal of the automatic transfer switch is connected to two terminals of the capacitive load, and the normally opened terminal of the automatic transfer switch is connected to an output terminal of the motor driver.

In another aspect, when the automatic transfer switch at least includes a normally closed terminal and a common terminal, on or off of the automatic transfer switch is controlled by a control signal or is closed or opened due to energization or deenergization, the winding is a group of turns constituting an electrical line corresponding to the voltage value of the transformer, the common terminal of the automatic transfer switch is connected to the winding of the alternating current motor and the output terminal of the motor driver, and the winding of the alternating current motor is directly connected to the output terminal of the motor driver, and the normally closed terminal of the automatic transfer switch is connected to two terminals of the capacitive load.

According to some embodiments, the motor assembly includes a motor driver, an automatic transfer switch, a capacitive load, and an alternating current motor. In the case that the automatic transfer switch is energized, windings of the alternating current motor are kept connected to the motor driver, and in the case that the automatic transfer switch is deenergized, the windings of the alternating current motor are switched to be connected to the capacitive load.

The motor assembly can reduce the fall speed of the stage light fixture in case of the power failure.

The automatic transfer switch in these embodiments includes one or more switch units. Each switch unit includes a common terminal, a normally closed terminal, and a normally opened terminal. The common terminal is connected to the windings of the alternating current motor, the normally closed terminal is connected to the capacitive load, and the normally opened terminal is connected to the motor driver.

Figure 2:
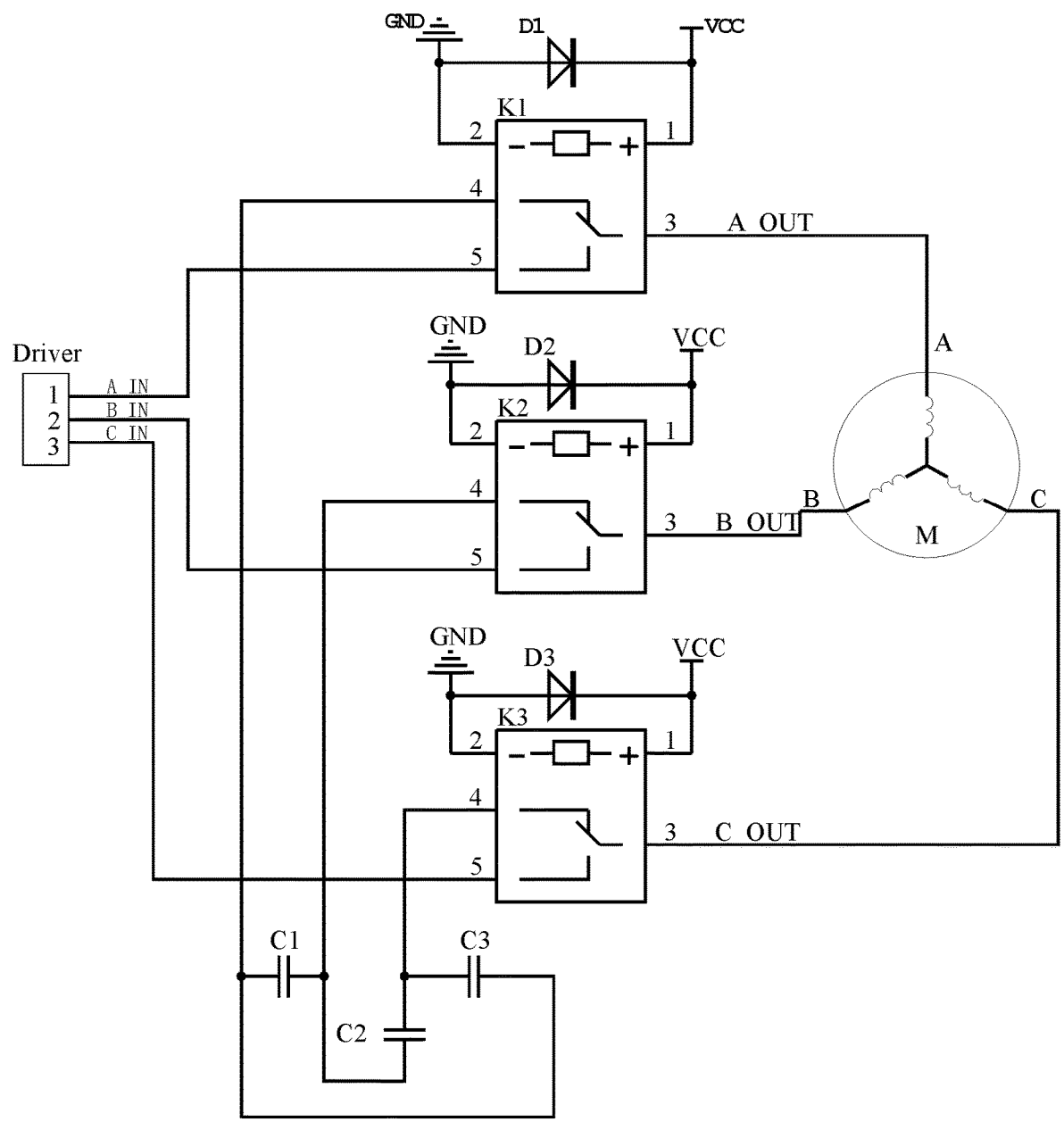
FIG. 2 is a second schematic circuit diagram of a motor assembly for slowing down a falling speed of a stage light fixture on power failure according to the present disclosure.
Figure 3:
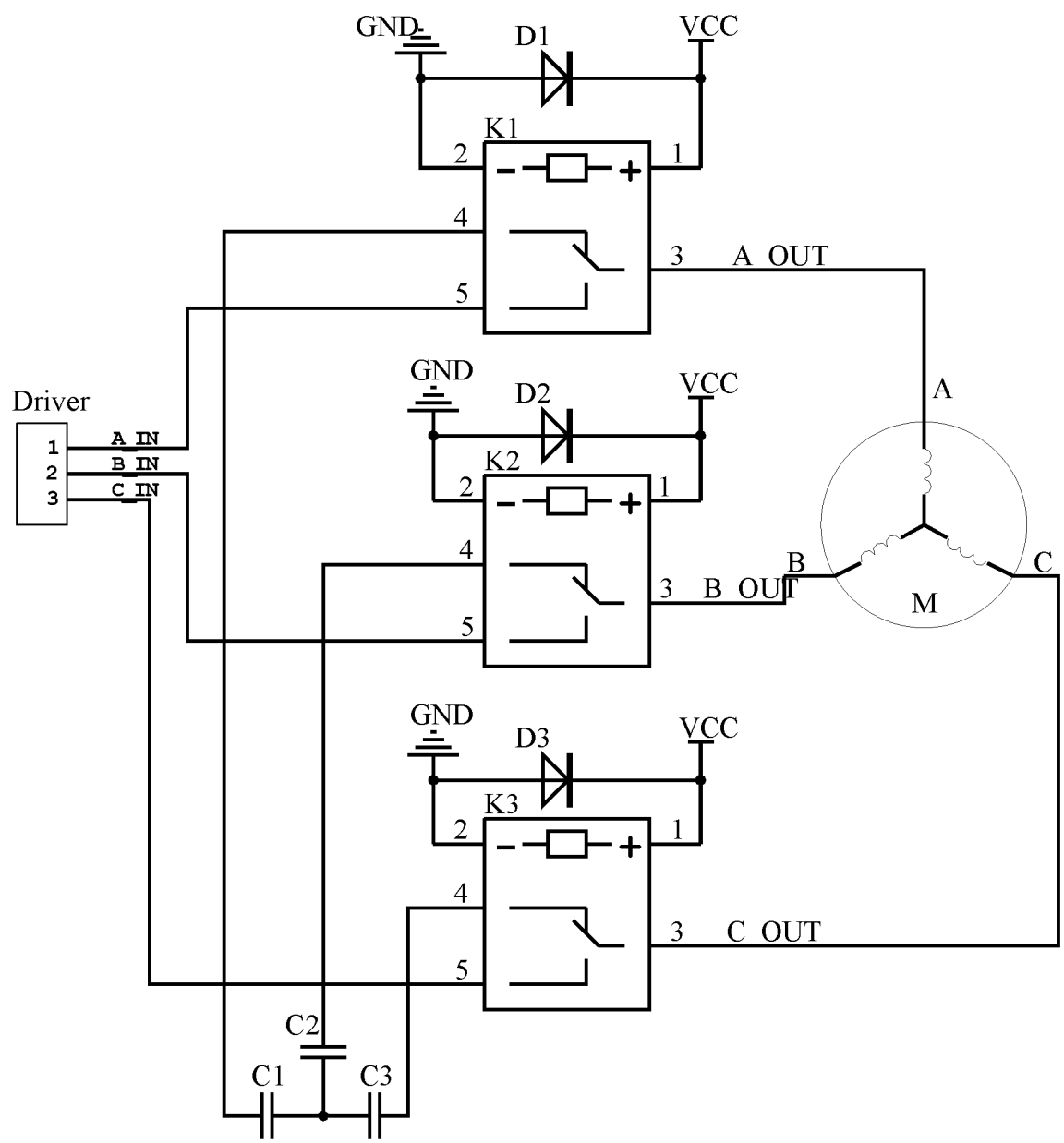
FIG. 3 is a third schematic circuit diagram of a motor assembly for slowing down a falling speed of a stage light fixture on power failure according to the present disclosure.

It should be noted that in this connection mode, when the automatic transfer switch is deenergized, both terminals of the windings are switched from the driver to the capacitive load, as illustrated in FIGS. 1 to 3.

Referring to FIG. 1, the motor assembly is a two-phase motor assembly. The two-phase motor assembly includes a motor driver, two automatic transfer switches, two capacitive loads, and a two-phase motor. In this embodiment, each of the two automatic transfer switch includes two switch units. Therefore, this embodiment includes four switch units. Common terminals of the four switch units are respectively connected to totally four terminals of two windings of the two-phase motor, normally closed terminals of the two switch units connected to the same winding are respectively connected to two terminals of one of the two capacitive loads, and normally opened terminals of the two switch units connected to the same winding are connected to an output terminal of the motor driver.

As shown in FIG. 1, the two-phase stepper motor assembly in this embodiment includes a motor driver, referred as Driver, two switch units in an automatic transfer switch K1, two switch units in an automatic transfer switch K2, two capacitive loads (a capacitive load C1 and a capacitive load C2), and a two-phase stepper motor M. A common terminal 3 of one of the two switch units in the automatic transfer switch K1 is connected to a terminal A+ of the windings of the two-phase motor M, and a common terminal 6 of one of the switch units in the automatic transfer switch K1 is connected to a terminal B+ of the windings of the two-phase motor M. A common terminal 3 of one of the two switch units in the automatic transfer switch K2 is connected to a terminal A− of the windings of the two-phase motor M, and a common terminal 6 of the other of the two switch units in the automatic transfer switch K2 is connected to a terminal B− of the windings of the two-phase motor M. It should be noted that it is feasible that each winding corresponds to the two switch units in one automatic transfer switch, instead of crossing each other.

Further, a normally closed terminal 2 of one of the two switch units in the automatic transfer switch K1 and a normally closed terminal 2 of one of the two switch units in the automatic transfer switch K2 are connected to two terminals of the capacitive load C1. A normally closed terminal 7 of one of the two switch units in the automatic transfer switch K1 and a normally closed terminal 7 of one of the two switch units in the automatic transfer switch K2 are connected to two terminals of the capacitive load C2.

Further, a normally opened terminal 4 of one of the two switch units in the automatic transfer switch K1 is connected to a terminal A+ of the motor driver, referred as Driver, and a normally opened terminal 5 of the other of the two switch units in the automatic transfer switch K1 is connected to a terminal B+ of the motor driver, referred as Driver. Further, a normally opened terminal 4 of one of the two switch units in the automatic transfer switch K2 is connected to a terminal A− of the motor driver, referred as Driver, and a normally opened terminal 5 of the other of the two switch units in the automatic transfer switch K2 is connected to a terminal B− of the motor driver, referred as Driver.

With regard to the stage light fixture, when the components of the stage light fixture are in normal operation, the power supply is supplying power or the switch unit outputs a coil pull-in signal, the coils of the two switch units in the automatic transfer switch K1 are pulled-in, and the coils of the two switch units in the automatic transfer switch K2 are pulled-in, and the four switch units are normally opened. The output terminals of the motor driver, referred as Driver, are connected to the winding of the two-phase motor M via the normally opened terminals of the four switch units; and the two-phase motor M operates according to the output signals of the motor driver, referred as Driver.

According to this embodiment, when the components of the stage light fixture are powered down, the coils of the two switch units in the automatic transfer switch K1 will be powered down, and the coils of the two switch units in the automatic transfer switch K2 will be also powered down. The four switch units are at normally closed terminates. The windings of the two-phase motor M are connected to two terminals of the capacitive load C1 and two terminals of the capacitive load C2. The components fall under gravity to drive the two-phase motor M to rotate. The induced electromotive force generated by the rotation of the two-phase motor M is an alternating current. The capacitive load has an alternating current isolation effect, the windings of the two-phase motor M are thus capable of generating an induced current, such that the two-phase motor M generates an electromagnetic torque with a braking effect.

The principle of powering down components of the stage light fixture is as follows.

When a component falls from top to bottom, the component drives the stepper motor to rotate. At this moment, the stepper motor is in a generator state, the induced electromotive force generated is an alternating current, the capacitive load has a direct current isolation and direct current interaction effect, the motor winding can also generate an induced current, and the motor has a braking torque. Since the capacity of the capacitive load is large enough, the current may not be interrupted.

Since both terminals of the windings are connected via a capacitive load, the capacitive load, as a load of the generator, is a capacitive load, and the capacitive load makes the phase of the induced current 90° ahead of the phase of the induced voltage. The directions of the electromotive forces generated by the armature magnetic field of the motor and the primary magnetic field of the permanent magnet are the same, and a longitudinal magnetization armature reaction may be generated. In this case, the magnetic flux increases, the induced voltage rises, and the induced current rises. However, where the winding is directly short-circuited, it is equivalent to a resistive load with a small resistance value, and the resistive load has no magnetization or demagnetization effect.

The electromagnetic torque of the generator is the braking torque, and the electromagnetic force formula is $F=N\Delta Bli$.

The number N of winding turns and the closed conductor path 1 are inherent properties of the motor, and the values thereof are constant. Since the motor is in a longitudinal axis magnetization armature reaction, the primary magnetic flux $\Delta B$ increases, the induced current i increases, the electromagnetic force increases, the electromagnetic torque increases, and the motor braking torque increases. In this way, the motor generates a greater braking torque than that in the case of short circuit of the windings at the same rotation speed, and the motor rotation speed is capable of generating a braking torque equal to the gravity at a lower time, such that the component falls at a lower speed, or a heavier component may also be braked.

Referring to FIG. 2, the motor assembly is a three-phase motor assembly in this embodiment. The three-phase motor assembly includes a motor driver, three automatic transfer switches, three capacitive loads, and a three-phase motor. It should be noted that in this embodiment, each of the three automatic transfer switches includes a switch unit. Therefore, this embodiment includes three switch units. Output terminals of the motor driver are connected to normally opened terminals of the three switch units, common terminals of the three switch units are connected to three windings of the three-phase motor, totally six terminals of the three capacitive loads are connected in sequence in a ring pattern, and each pair of normally closed terminals of the three switch units is connected to two terminals of each of the capacitive loads.

As shown as FIG. 2, the three-phase stepper motor assembly in this embodiment includes a motor driver, referred as Driver, a switch unit in an automatic transfer switch K1, a switch unit in an automatic transfer switch K2, a switch unit in an automatic transfer switch K3, three capacitive loads (a capacitive load C1, a capacitive load C2, and a capacitive load C3), and a three-phase stepper motor M.

According to this embodiment, a normally opened terminal 5 of the switch unit in the automatic transfer switch K1 is connected to a terminal A-IN of the motor driver, referred as Driver, a normally opened terminal 5 of the switch unit in the automatic transfer switch K2 is connected to a terminal B-IN of the motor driver, referred as Driver, and a normally opened terminal 5 of the switch unit in the automatic transfer switch K3 is connected to a terminal C-IN of the motor driver, referred as Driver.

Further, a common terminal 3 (A OUT) of the switch unit in the automatic transfer switch K1 is connected to a terminal A of the windings of the three-phase motor M, a common terminal 3 (B OUT) of the switch unit in the automatic transfer switch K2 is connected to a terminal B of the winding of the three-phase motor M, and a common terminal 3 (C OUT) of the switch unit in the automatic transfer switch K3 is connected to a terminal C of the winding of the three-phase motor M.

Further, a normally closed terminal 4 of the switch unit in the automatic transfer switch K1 and a normally closed terminal 4 of the switch unit in the automatic transfer switch K2 are connected to two terminals of the capacitive load C1, the normally closed terminal 4 of the switch unit in the automatic transfer switch K2 and a normally closed terminal 4 of the switch unit in the automatic transfer switch K3 are connected to two terminals of the capacitive load C2, and the normally closed terminal 4 of the switch unit in the automatic transfer switch K1 and the normally closed terminal 4 of the switch unit in the automatic transfer switch K3 are connected to two terminals of the capacitive load C3.

It may be thus understood that the normally closed terminal 4 of the switch unit in the automatic transfer switch K1 and the normally closed terminal 4 of the switch unit in the automatic transfer switch K2 are pairwise connected to two terminals of the capacitive load C1, the normally closed terminal 4 of the switch unit in the automatic transfer switch K2 and the normally closed terminal 4 of the switch unit in the automatic transfer switch K3 are pairwise connected to two terminals of the capacitive load C2, and the normally closed terminal 4 of the switch unit in the automatic transfer switch K1 and the normally closed terminal 4 of the switch unit in the automatic transfer switch K3 are pairwise connected to two terminals of the capacitive load C3.

It may be further understood that two terminals of the capacitive load C1, two terminals of the capacitive load C2, and two terminals of the capacitive load C3 are connected in sequence in a ring pattern, and the normally closed terminal of the switch unit in the automatic transfer switch K1, the normally closed terminal of the switch unit in the automatic transfer switch K2, and the normally closed terminal of the switch unit in the automatic transfer switch K3 are respectively pairwise connected to two terminals one of the capacitive loads.

The circuit operation of the three-phase stepper motor assembly in this embodiment is the same as the circuit operation of the two-phase stepper motor assembly, which is thus not described herein any further.

Referring to FIG. 3, the motor assembly is a three-phase motor assembly in this embodiment. The three-phase motor assembly includes a motor driver, three automatic transfer switches, three capacitive loads, and a three-phase motor. It should be noted that in this embodiment, each of the three automatic transfer switches includes a switch unit. Therefore, this embodiment includes three switch units. Output terminals of the motor driver are connected to normally opened terminals of the three switch units, common terminals of the three switch units are connected to three windings of the three-phase motor, three terminals of the three capacitive loads are connected to each other in a radial pattern, and each of normally closed terminals of the three switch units is connected to the other terminal of one of the capacitive loads.

It may be thus understood that the three-phase stepper motor assembly in this embodiment includes a motor driver, referred as Driver, a switch unit in an automatic transfer switch K1, a switch unit in an automatic transfer switch K2, a switch unit in an automatic transfer switch K3, three capacitive loads (a capacitive load C1, a capacitive load C2, and a capacitive load C3), and a three-phase stepper motor M. A normally opened terminal 5 of the switch unit in the automatic transfer switch K1 is connected to a terminal A-IN of the motor driver, referred as Driver, a normally opened terminal 5 of the switch unit in the automatic transfer switch K2 is connected to a terminal B-IN of the motor driver, referred as Driver, and a normally opened terminal 5 of the switch unit in the automatic transfer switch K3 is connected to a terminal C-IN of the motor driver, referred as Driver.

Further, a common terminal 3 (A OUT) of the switch unit in the automatic transfer switch K1 is connected to a terminal A of the windings of the three-phase motor M, a common terminal 3 (B OUT) of the switch unit in the automatic transfer switch K2 is connected to a terminal B of the winding of the three-phase motor M, and a common terminal 3 (C OUT) of the switch unit in the automatic transfer switch K3 is connected to a terminal C of the winding of the three-phase motor M.

Further, a normally closed terminal 4 of the switch unit in the automatic transfer switch K1 is connected to one terminal of the capacitive load C1, and the other terminal of the capacitive load C1 is connected to one terminal of the capacitive load C2 and one terminal of the capacitive load C3. A normally closed terminal 4 of the switch unit in the automatic transfer switch K2 is connected to one terminal of the capacitive load C2, and the other terminal of the capacitive load C2 is connected to one terminal of the capacitive load C1 and one terminal of the capacitive load C3. A normally closed terminal 4 of the switch unit in the automatic transfer switch K3 is connected to one terminal of the capacitive load C3, and the other terminal of the capacitive load C3 is connected to one terminal of the capacitive load C1 and one terminal of the capacitive load C2.

It may be understood that the normally closed terminal 4 of the switch unit in the automatic transfer switch K1 and the normally closed terminal 4 of the switch unit in the automatic transfer switch K2 are pairwise connected to one terminal of the capacitive load C1 and one terminal of the capacitive load C2, and the other terminal of the capacitive load C1 and the other terminal of the capacitive load C2 are connected to each other. The normally closed terminal 4 of the switch unit in the automatic transfer switch K1 and the normally closed terminal 4 of the switch unit in the automatic transfer switch K3 are pairwise connected to one terminal of the capacitive load C1 and one terminal of the capacitive load C3, and the other terminal of the capacitive load C1 and the other terminal of the capacitive load C3 are connected to each other. The normally closed terminal 4 of the switch unit in the automatic transfer switch K2 and the normally closed terminal 4 of the switch unit in the automatic transfer switch K3 are pairwise connected to one terminal of the capacitive load C2 and one terminal of the capacitive load C3, and the other terminal of the capacitive load C2 and the other terminal of the capacitive load C3 are connected to each other.

It may be further understood that one terminal of the capacitive load C1, one terminal of the capacitive load C2, and one terminal of the capacitive load C3 are connected to each other in a radial pattern, and each of the normally closed terminal of the switch unit in the automatic transfer switch K1, the normally closed terminal of the switch unit in the automatic transfer switch K2, and the normally closed terminal of the switch unit in the automatic transfer switch K3 is connected to one terminal of one of the capacitive loads.

The circuit operation of the three-phase stepper motor assembly in this embodiment is the same as the circuit operation of the two-phase stepper motor assembly, which is thus not described herein any further.

According to some embodiments, one terminal of at least one of the windings of the alternating current motor is connected to one corresponding terminal of the motor driver and one corresponding terminal of the capacitive load, and the other terminal of the at least one of the windings of the alternating current motor is connected to the common terminal of the corresponding switch unit, the normally closed terminal of the corresponding switch unit is connected to the other terminal of the capacitor load corresponding to the winding, and the normally opened terminal of the corresponding switch unit is connected to another motor driver corresponding to the winding.

Figure 4:
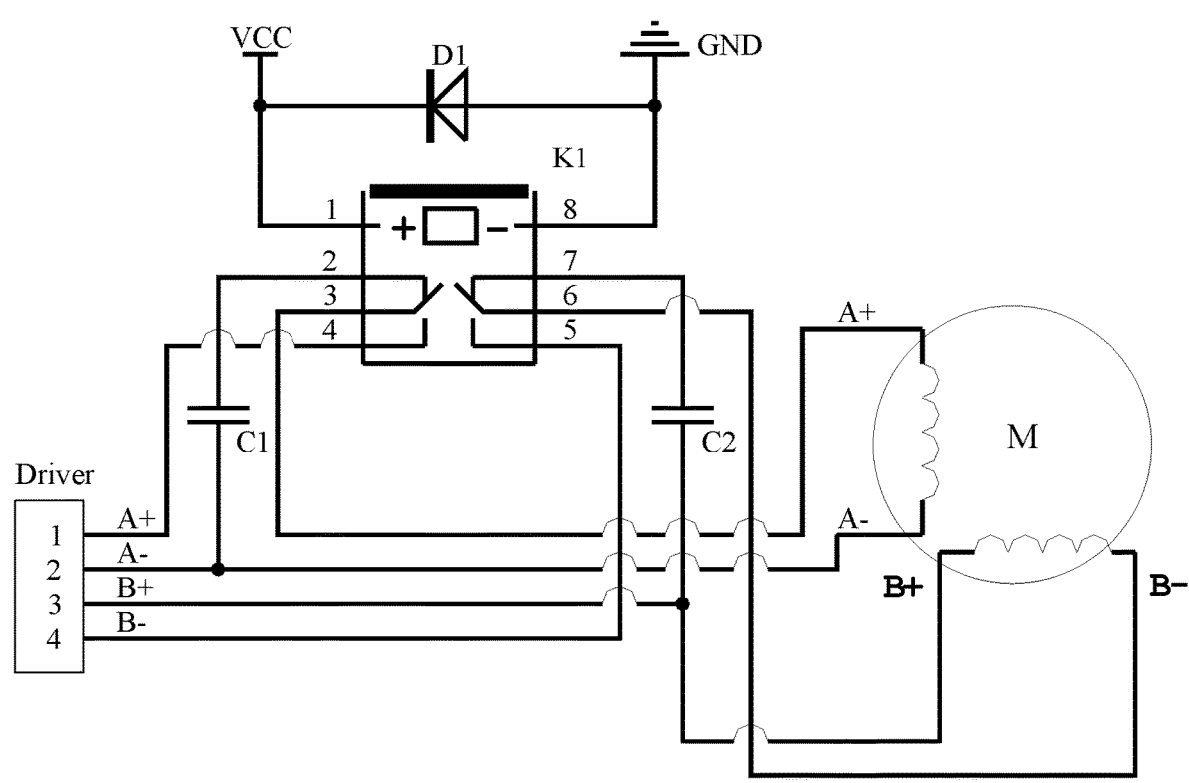
FIG. 4 is a fourth schematic circuit diagram of a motor assembly for slowing down a falling speed of a stage light fixture on power failure according to the present disclosure.
Figure 5:
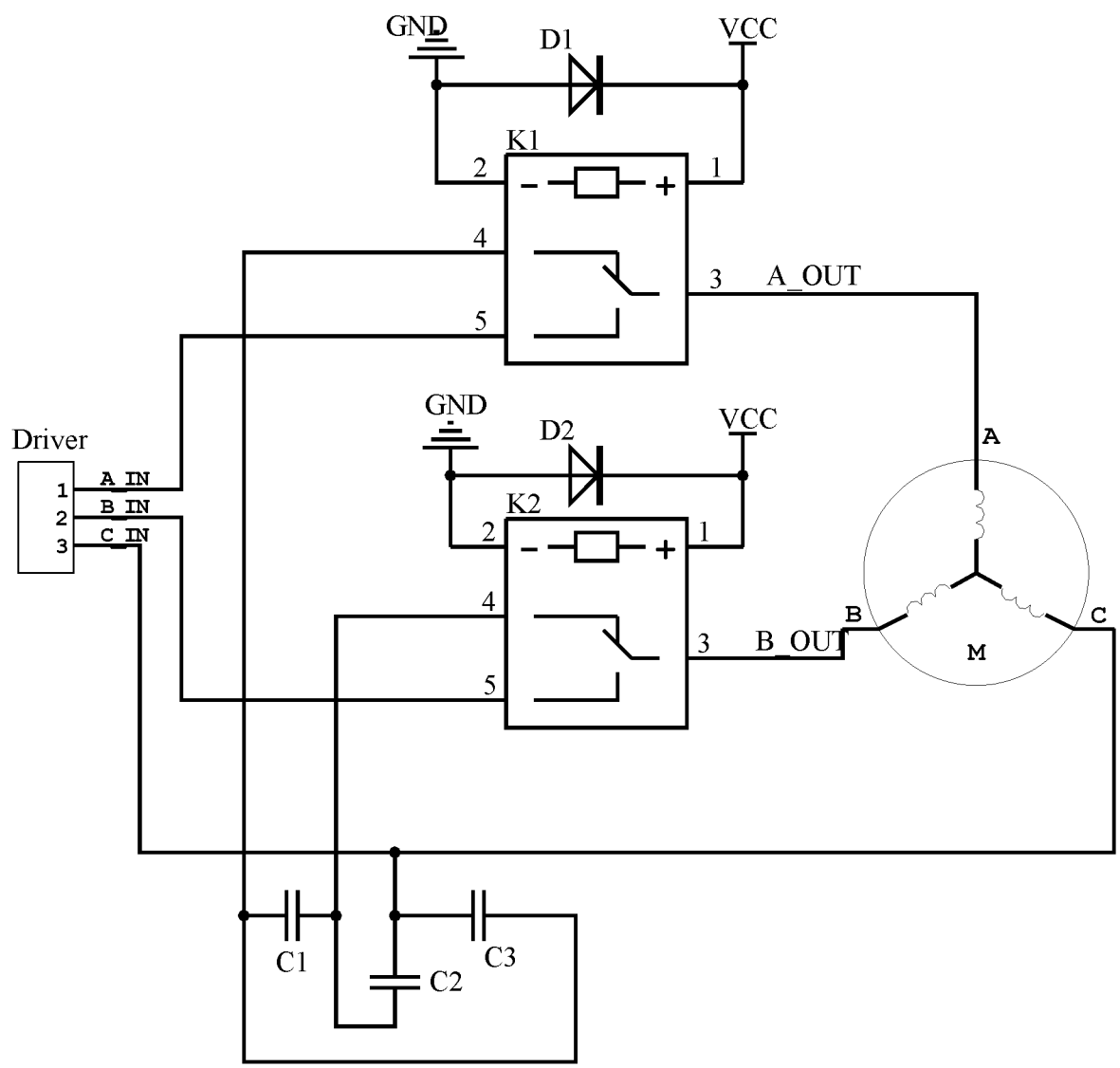
FIG. 5 is a fifth schematic circuit diagram of a motor assembly for slowing down a falling speed of a stage light fixture on power failure according to the present disclosure.

It should be noted that in this connection mode, when the automatic transfer switch is deenergized, only one terminal of the windings is switched from the driver to the capacitive load, and the other terminal remains connected to the driver and the capacitive load at the same time, as illustrated in FIGS. 4 and 5.

Referring to FIG. 4, the motor assembly is a two-phase motor assembly in this embodiment. The two-phase motor assembly includes a motor driver, one automatic transfer switch, two capacitive loads, and a two-phase motor. It should be noted that in this embodiment, the automatic transfer switch includes two switch units. Therefore, this embodiment includes two switch units. The motor drive has two terminals for each phase of the motor. One of the two terminals of the motor driver for each phase is connected to one terminal of one of the windings and one terminal of one of the two capacitive loads, the other one of the two terminals of the motor driver for each phase is connected to a normally opened terminal of one of the two switch units, a common terminal of the corresponding switch unit is connected to the other terminal of the winding, and a normally closed terminal of the corresponding switch unit is connected to the other terminal of the capacitive load.

It may be thus understood that the two-phase stepper motor assembly in this embodiment includes a motor driver, referred as Driver, two switch units in an automatic transfer switch K1, two capacitive loads (a capacitive load C1 and a capacitive load C2), and a two-phase stepper motor M.

A normally closed terminal 2 of one of the two switch units in the automatic transfer switch K1 is connected to one terminal of the capacitive load C1, the other terminal of the capacitive load C1 is connected to a terminal A− of the motor driver, referred as Driver, and the terminal A− of the motor driver, referred as Driver is also connected to a terminal A− of the windings of the two-phase motor M. A normally closed terminal 7 of one of the two switch units in the automatic transfer switch K1 is connected to one terminal of the capacitive load C2, the other terminal of the capacitive load C2 is connected to a terminal B+ of the motor driver, referred as Driver, and the terminal B+ of the motor driver, referred as Driver is also connected to a terminal B+ of the windings of the two-phase motor M.

Further, a common terminal 3 of one of the two switch units in the automatic transfer switch K1 is connected to a terminal A+ of the windings of the two-phase motor M, and a common terminal 6 of the other of the two switch units in the automatic transfer switch K1 is connected to a terminal B− of the windings of the two-phase motor M. A normally opened terminal 4 of one of the two switch units in the automatic transfer switch K1 is connected to a terminal A+ of the motor driver, referred as Driver, and a normally opened terminal 5 of the other of the two switch units in the automatic transfer switch K1 is connected to a terminal B− of the motor driver, referred as Driver.

It should be noted that FIG. 4 illustrates only one of the connection methods, and this embodiment discloses a total of four connection methods, which are not listed here.

When the motor is in normal operation, the windings of the two switch units in the automatic transfer switch K1 are conducted and pulled-in, and the two switch units in the automatic transfer switch K1 are normally opened. In this case, output signals (a terminal A+ and a terminal B−) of the motor driver, referred as Driver are connected to two terminals (a terminal A+ and a terminal B−) of the two-phase motor M via the normally opened terminals of the two switch units in the automatic transfer switch K1. In this case, the two-phase motor M operates according to the drive signals.

When the light fixture is subjected to a power failure, the windings of the two switch units in the automatic transfer switch K1 are disconnected, and the two switch units in the automatic transfer switch K1 are normally closed. In this way, the terminals A+, A−, B+, and B− of the windings of the two-phase motor M are connected to two terminals of the capacitive load C1 and two terminals of the capacitive load C2 via the normally closed terminals of the two switch units in the automatic transfer switch K1.

The components fall under gravity to drive the two-phase motor M to rotate. The induced electromotive force generated by the rotation of the two-phase motor M is an alternating current. The capacitive load has an alternating current isolation effect. The windings of the two-phase motor M are capable of generating an induced current, such that the two-phase motor M generates an electromagnetic torque with a braking effect.

Referring to FIG. 5, the motor assembly is a three-phase motor assembly in this embodiment. The three-phase motor assembly includes a motor driver, two automatic transfer switches, three capacitive loads, and a three-phase motor. It should be noted that in this embodiment, each of the two automatic transfer switches includes a switch unit. Therefore, this embodiment includes two switch units. Output terminals of the motor driver are connected to normally opened terminals of the two switch units, common terminals of the two switch units are connected to two windings of the three-phase motor, totally six terminals of the three capacitive loads are connected in sequence in a ring pattern, normally closed terminals of the two switch units are respectively connected to two terminals of one of the three capacitive loads, and the remaining output terminal of the motor driver and the remaining winding of the three-phase motor are connected to the remaining terminal of the capacitive load. Alternatively, three terminals of the three capacitive loads are connected to each other in a radial pattern, the normally closed terminals of the two switch units are respectively connected to the other terminals of the two of the three capacitive loads, and the remaining output terminal and the remaining winding of the three-phase motor are connected to the other terminal of the remaining one of the three capacitive loads.

It may be thus understood that the three-phase stepper motor assembly in this embodiment includes a motor driver, referred as Driver, a switch unit in an automatic transfer switch K1, a switch unit in an automatic transfer switch K2, three capacitive loads (a capacitive load C1, a capacitive load C2, and a capacitive load C3), and a three-phase stepper motor M.

A normally opened terminal 5 of the switch unit in the automatic transfer switch K1 is connected to a terminal A-IN of the motor driver, referred as Driver, a normally opened terminal 5 of the switch unit in the automatic transfer switch K2 is connected to a terminal B-IN of the motor driver, referred as Driver, and a terminal C-IN of the motor driver, referred as Driver is connected to a terminal C of the windings of the three-phase motor M.

A common terminal 3 (A OUT) of the switch unit in the automatic transfer switch K1 is connected to a terminal A of the windings of the three-phase motor M, and a common terminal 3 (B OUT) of the switch unit in the automatic transfer switch K2 is connected to a terminal B of the windings of the two-phase motor M.

Further, a normally closed terminal 4 of the switch unit in the automatic transfer switch K1 and a normally closed terminal 4 of the switch unit in the automatic transfer switch K2 are connected to two terminals of the capacitive load C1, the normally closed terminal 4 of the switch unit in the automatic transfer switch K2 and the terminal C-IN of the motor driver, referred as Driver are connected to two terminals of the capacitive load C2, and the normally closed terminal 4 of the switch unit in the automatic transfer switch K1 and the terminal C-IN of the motor driver, referred as Driver are connected to two terminals of the capacitive load C3.

It may be thus understood that the normally closed terminal 4 of the switch unit in the automatic transfer switch K1 and the normally closed terminal 4 of the switch unit in the automatic transfer switch K2 are pairwise connected to two terminals of the capacitive load C1, the normally closed terminal 4 of the switch unit in the automatic transfer switch K2 and the terminal C-IN of the motor driver, referred as Driver are pairwise connected to two terminals of the capacitive load C2, and the normally closed terminal 4 of the switch unit in the automatic transfer switch K1 and the terminal C-IN of the motor driver, referred as Driver are pairwise connected to two terminals of the capacitive load C3.

It may be further understood that two terminals of the capacitive load C1, two terminals of the capacitive load C2, and two terminals of the capacitive load C3 are connected in sequence in a ring pattern, the normally closed terminal of the switch unit in the automatic transfer switch K1 and the normally closed terminal of the switch unit in the automatic transfer switch K2 are respectively connected to two terminals of one of the three capacitive loads, and the remaining output terminal of the motor driver and the remaining winding of the three-phase motor are connected to totally four terminals of the remaining two of the three capacitive loads.

It may be alternatively understood that one terminal of the capacitive load C1, one terminal of the capacitive load C2, and one terminal of the capacitive load C3 are connected to each other in a radial pattern, the normally closed terminal of the switch unit in the automatic transfer switch K1 and the normally closed terminal of the switch unit in the automatic transfer switch K2 are respectively connected to the other terminals of two of the three capacitive loads, and the remaining output terminal of the motor driver and the remaining winding of the three-phase motor are connected to the other terminal of the remaining one of the three capacitive loads.

The circuit operation of the three-phase stepper motor assembly in this embodiment is the same as the circuit operation of the two-phase stepper motor assembly, which is thus not described herein any further.

In another aspect, according to some embodiments, each of the automatic transfer switches in the motor assembly includes one or more switch units. Each switch unit includes a common terminal and a normally closed terminal. The windings of the alternating current motor are directly connected to corresponding terminals of the motor driver and further connected to the common terminal, and the normally closed terminal is connected to the capacitive load.

Further, the normally closed terminal of the corresponding switch unit is connected to two terminals of the corresponding capacitive load corresponding to the winding.

Figure 6:
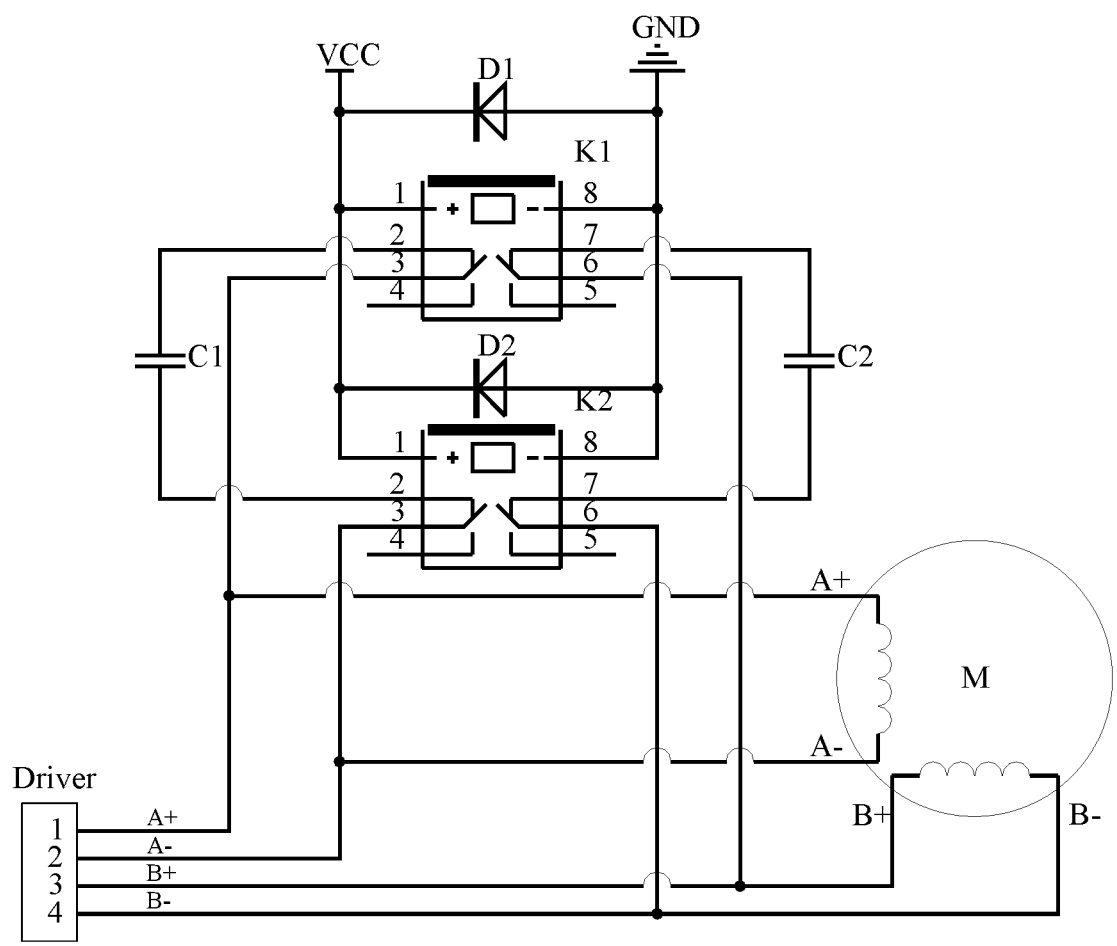
FIG. 6 is a sixth schematic circuit diagram of a motor assembly for slowing down a falling speed of a stage light fixture on power failure according to the present disclosure.
Figure 8:
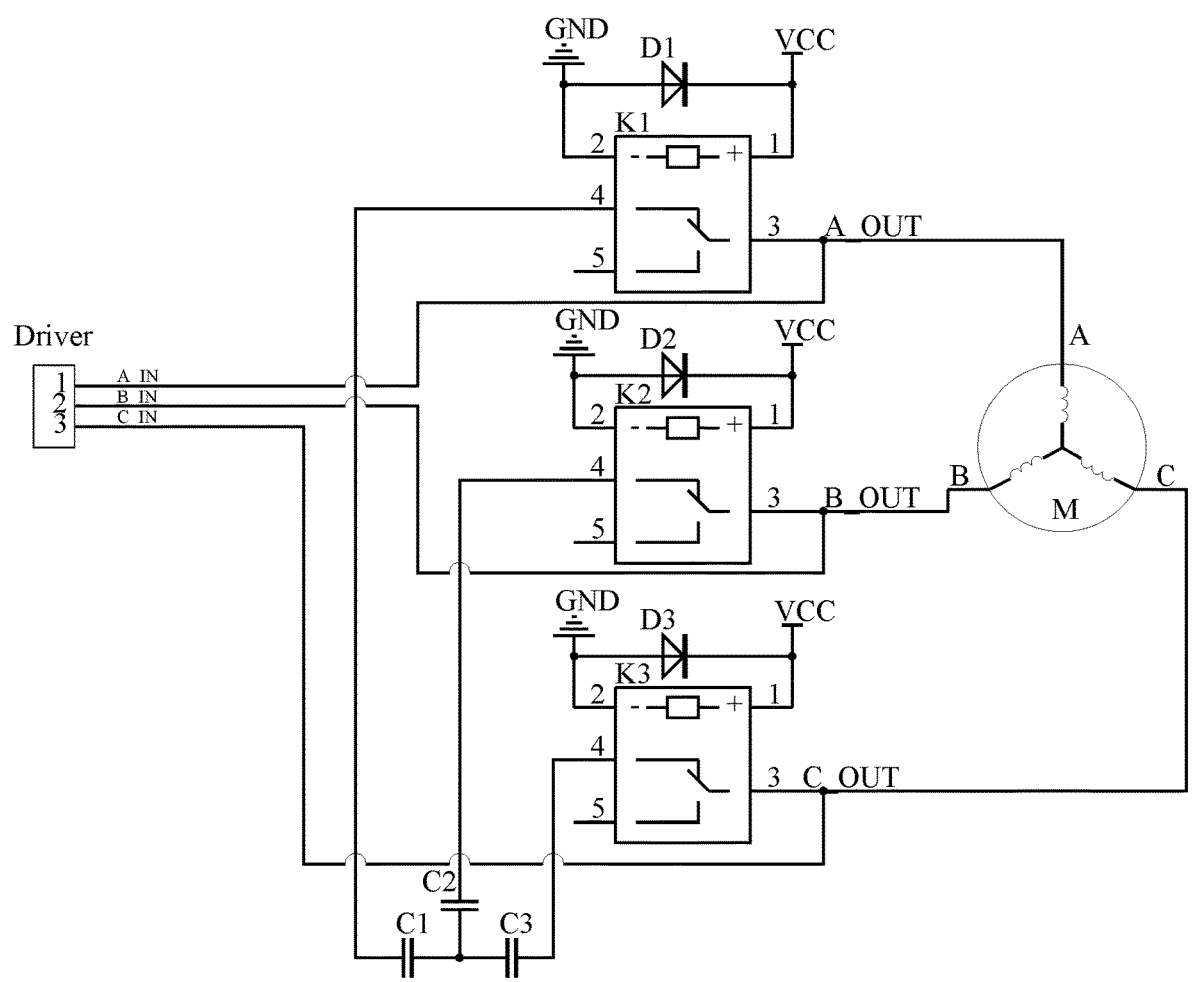
FIG. 8 is an eighth schematic circuit diagram of a motor assembly for slowing down a falling speed of a stage light fixture on power failure according to the present disclosure.

It should be noted that in this connection mode, when the automatic transfer switch is turned off, two terminals of the windings are both switched from the driver to the capacitive load, as illustrated in FIGS. 6 and 8.

Referring to FIG. 6, the motor assembly is a two-phase motor assembly in this embodiment. The two-phase motor assembly includes a motor driver, two automatic transfer switches, two capacitive loads, and a two-phase motor. It should be noted that in this embodiment, each of the two automatic transfer switch includes two switch units. Therefore, this embodiment includes four switch units. Common terminals of the four switch units are connected to two terminals of two windings of the two-phase motor, and two output terminals of the drive motor corresponding to the windings. Normally closed terminals of the two switch units connected to the same winding are respectively connected to two terminals of one of the two capacitive loads.

It may be thus understood that the two-phase stepper motor assembly in this embodiment includes a motor driver, referred as Driver, two switch units in an automatic transfer switch K1, two switch units in an automatic transfer switch K2, two capacitive loads (a capacitive load C1 and a capacitive load C2), and a two-phase motor M. A terminal A+ of the windings of the two-phase motor M is connected to a terminal A+ of the motor driver, referred as Driver and further connected to a common terminal 3 of one of the two switch units in the automatic transfer switch K1, and a terminal B+ of the windings of the two-phase motor M is connected to a terminal B+ of the motor driver, referred as Driver and further connected to a common terminal 6 of the other of the two switch units in the automatic transfer switch K1. A terminal A− of the windings of the two-phase motor M is connected to a terminal A− of the motor driver, referred as Driver and further connected to a common terminal 3 of one of the two switch units in the automatic transfer switch K2, and a terminal B− of the windings of the two-phase motor M is connected to a terminal B− of the motor driver, referred as Driver and further connected to a common terminal 6 of the other of the two switch units in the automatic transfer switch K2. It should be noted that it is feasible that each winding corresponds to the two switch units in one automatic transfer switch, instead of crossing each other.

Further, a normally closed terminal 2 of one of the two switch units in the automatic transfer switch K1 and a normally closed terminal 2 of one of the two switch units in the automatic transfer switch K2 are connected to two terminals of the capacitive load C1. A normally closed terminal 7 of one of the two switch units in the automatic transfer switch K1 and a normally closed terminal 7 of one of the two switch units in the automatic transfer switch K2 are connected to two terminals of the capacitive load C2.

When the components of the stage light fixture are in normal operation, the power supply is supplying power or the switch unit outputs a coil pull-in signal, the coils of the two switch units in the automatic transfer switch K1 are pulled-in, and the coils of the two switch units in the automatic transfer switch K2 are pulled-in, and the four switch units are opened. The output terminals of the motor driver, referred as Driver are directly connected to the windings of the two-phase motor M and further connected to the common terminals of the four switch units; and the two-phase motor M operates according to the output signals of the motor driver, referred as Driver.

When the light fixture is subjected to a power failure, the coils of the relays are powered down, the relays are at a normally closed contact, and the windings of the motor are connected to two terminals of the capacitor. The components fall under gravity to drive the two-phase motor M to rotate. The induced electromotive force generated by the rotation of the motor is an alternating current. The capacitive load has an alternating current isolation effect. The windings of the motor are capable of generating an induced current, such that the motor generates an electromagnetic torque with a braking effect.

When the components of the stage light fixture are powered down, the coils of the two switch units in the automatic transfer switch K1 are powered down, and the coils of the two switch units in the automatic transfer switch K2 are powered down. The four switch units are normally closed. The windings of the two-phase motor M are connected to two terminals of the capacitive load C1 and two terminals of the capacitive load C2. The components fall under gravity to drive the two-phase motor M to rotate. The induced electromotive force generated by the rotation of the two-phase motor M is an alternating current. The capacitive load has an alternating current isolation effect. The windings of the two-phase motor M are capable of generating an induced current, such that the two-phase motor M generates an electromagnetic torque with a braking effect. In a circuit in which the two-phase motor M is directly connected to the motor driver, referred as Driver, since the motor driver, referred as Driver stops operating in case of a power failure, the circuit is equivalent to a rectifier bridge circuit composed of only freewheeling diodes, the alternating current induced electromotive force generated by the two-phase motor M becomes a direct current in case of traveling through the rectifier bridge, and the front terminal of the motor driver, referred as Driver is only connected to some capacitive loads with a small capacity. In the case that the capacitive load is fully charged by the induced electricity generated at the moment of the power failure, a complete current loop fails to be formed with circuit of the motor driver, referred as Driver. Therefore, the induced current generated by the two-phase motor M will only be connected to the loop of the capacitors via the normally closed terminals of the relays.

Figure 7:
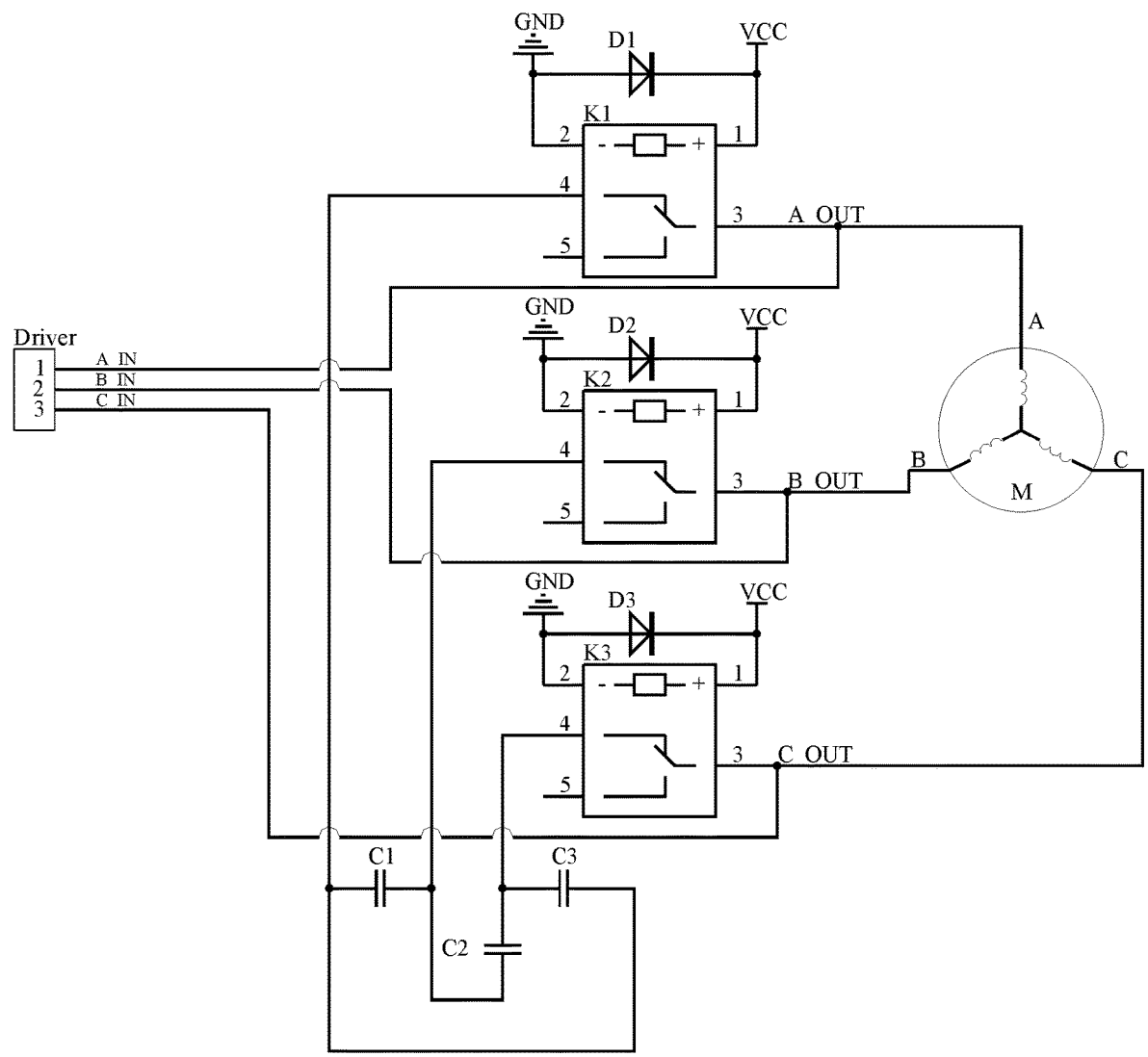
FIG. 7 is a seventh schematic circuit diagram of a motor assembly for slowing down a falling speed of a stage light fixture on power failure according to the present disclosure.

Referring to FIG. 7, the motor assembly is a three-phase motor assembly in the embodiment. The three-phase motor assembly includes a motor driver, three automatic transfer switches, three capacitive loads, and a three-phase motor. It should be noted that in this embodiment, each of the three automatic transfer switches includes a switch unit. Therefore, the three-phase motor assembly according to this embodiment includes a motor driver, three switch units, three capacitive loads, and a three-phase motor. Common terminals of the three switch units are connected to three windings of the three-phase motor and output terminals of the motor driver corresponding to the three windings, totally six terminals of the three capacitive loads are connected in sequence in a ring pattern, and each pair of normally closed terminals of the three switch units is connected to two terminals of each of the capacitive loads.

It may be thus understood that the three-phase stepper motor assembly in this embodiment includes a motor driver, referred as Driver, a switch unit in an automatic transfer switch K1, a switch unit in an automatic transfer switch K2, a switch unit in an automatic transfer switch K3, three capacitive loads (a capacitive load C1, a capacitive load C2, and a capacitive load C3), and a three-phase stepper motor M.

A terminal A-IN of the motor driver, referred as Driver is connected to a terminal A of the windings of the three-phase motor M and further connected to a common terminal 3 (A OUT) of the switch unit in the automatic transfer switch K1, a terminal B-IN of the motor driver, referred as Driver is connected to a terminal B of the windings of the three-phase motor M and further connected to a common terminal 3 (B OUT) of the switch unit in the automatic transfer switch K2, and a terminal C-IN of the motor driver, referred as Driver is connected to a terminal C of the windings of the three-phase motor M and further connected to a common terminal 3 (C OUT) of the switch unit in the automatic transfer switch K3.

Further, a normally closed terminal 4 of the switch unit in the automatic transfer switch K1 and a normally closed terminal 4 of the switch unit in the automatic transfer switch K2 are connected to two terminals of the capacitive load C1, the normally closed terminal 4 of the switch unit in the automatic transfer switch K2 and a normally closed terminal 4 of the switch unit in the automatic transfer switch K3 are connected to two terminals of the capacitive load C2, and the normally closed terminal 4 of the switch unit in the automatic transfer switch K1 and the normally closed terminal 4 of the switch unit in the automatic transfer switch K3 are connected to two terminals of the capacitive load C3.

It may be thus understood that the normally closed terminal 4 of the switch unit in the automatic transfer switch K1 and the normally closed terminal 4 of the switch unit in the automatic transfer switch K2 are pairwise connected to two terminals of the capacitive load C1, the normally closed terminal 4 of the switch unit in the automatic transfer switch K2 and the normally closed terminal 4 of the switch unit in the automatic transfer switch K3 are pairwise connected to two terminals of the capacitive load C2, and the normally closed terminal 4 of the switch unit in the automatic transfer switch K1 and the normally closed terminal 4 of the switch unit in the automatic transfer switch K3 are pairwise connected to two terminals of the capacitive load C3.

It may be further understood that two terminals of the capacitive load C1, two terminals of the capacitive load C2, and two terminals of the capacitive load C3 are connected in sequence in a ring pattern, and the normally closed terminal of the switch unit in the automatic transfer switch K1, the normally closed terminal of the switch unit in the automatic transfer switch K2, and the normally closed terminal of the switch unit in the automatic transfer switch K3 are respectively pairwise connected to two terminals one of the capacitive loads.

The circuit operation of the three-phase stepper motor assembly in this embodiment is the same as the circuit operation of the two-phase stepper motor assembly, which is thus not described herein any further.

Referring to FIG. 8, the motor assembly is a three-phase motor assembly in this embodiment. The three-phase motor assembly includes a motor driver, three automatic transfer switches, three capacitive loads, and a three-phase motor. It should be noted that in this embodiment, each of the three automatic transfer switches includes a switch unit. Therefore, the three-phase motor assembly according to this embodiment includes a motor driver, three switch units, three capacitive loads, and a three-phase motor. Output terminals of the motor driver are connected to common terminals of the three switch units, the common terminals of the three switch units are further connected to three windings of the three-phase motor, three terminals of the three capacitive loads are connected to each other in a radial pattern, and each of normally closed terminals of the three switch units is connected to the other terminal of one of the capacitive loads.

It may be thus understood that the three-phase stepper motor assembly in this embodiment includes a motor driver, referred as Driver, a switch unit in an automatic transfer switch K1, a switch unit in an automatic transfer switch K2, a switch unit in an automatic transfer switch K3, three capacitive loads (a capacitive load C1, a capacitive load C2, and a capacitive load C3), and a three-phase stepper motor M.

A terminal A-IN of the motor driver, referred as Driver is connected to a terminal A of the windings of the three-phase motor M and further connected to a common terminal 3 (A OUT) of the switch unit in the automatic transfer switch K1, a terminal B-IN of the motor driver, referred as Driver is connected to a terminal B of the windings of the three-phase motor M and further connected to a common terminal 3 (B OUT) of the switch unit in the automatic transfer switch K2, and a terminal C-IN of the motor driver, referred as Driver is connected to a terminal C of the windings of the three-phase motor M and further connected to a common terminal 3 (C OUT) of the switch unit in the automatic transfer switch K3.

Further, a normally closed terminal 4 of the switch unit in the automatic transfer switch K1 is connected to one terminal of the capacitive load C1, and the other terminal of the capacitive load C1 is connected to one terminal of the capacitive load C2 and one terminal of the capacitive load C3. A normally closed terminal 4 of the switch unit in the automatic transfer switch K2 is connected to one terminal of the capacitive load C2, and the other terminal of the capacitive load C2 is connected to one terminal of the capacitive load C1 and one terminal of the capacitive load C3. A normally closed terminal 4 of the switch unit in the automatic transfer switch K3 is connected to one terminal of the capacitive load C3, and the other terminal of the capacitive load C3 is connected to one terminal of the capacitive load C1 and one terminal of the capacitive load C2.

It may be understood that the normally closed terminal 4 of the switch unit in the automatic transfer switch K1 and the normally closed terminal 4 of the switch unit in the automatic transfer switch K2 are pairwise connected to one terminal of the capacitive load C1 and one terminal of the capacitive load C2, and the other terminal of the capacitive load C1 and the other terminal of the capacitive load C2 are connected to each other. The normally closed terminal 4 of the switch unit in the automatic transfer switch K1 and the normally closed terminal 4 of the switch unit in the automatic transfer switch K3 are pairwise connected to one terminal of the capacitive load C1 and one terminal of the capacitive load C3, and the other terminal of the capacitive load C1 and the other terminal of the capacitive load C3 are connected to each other. The normally closed terminal 4 of the switch unit in the automatic transfer switch K2 and the normally closed terminal 4 of the switch unit in the automatic transfer switch K3 are pairwise connected to one terminal of the capacitive load C2 and one terminal of the capacitive load C3, and the other terminal of the capacitive load C2 and the other terminal of the capacitive load C3 are connected to each other.

It may be further understood that one terminal of the capacitive load C1, one terminal of the capacitive load C2, and one terminal of the capacitive load C3 are connected to each other in a radial pattern, and each of the normally closed terminal of the switch unit in the automatic transfer switch K1, the normally closed terminal of the switch unit in the automatic transfer switch K2, and the normally closed terminal of the switch unit in the automatic transfer switch K3 is connected to the other terminal of one of the capacitive loads.

The circuit operation of the three-phase stepper motor assembly in this embodiment is the same as the circuit operation of the two-phase stepper motor assembly, which is thus not described herein any further.

According to some embodiments, one terminal of at least one of the windings of the alternating current motor is connected to one corresponding output terminal of the motor driver and further connected to the common terminal of the corresponding switch unit, one terminal of the capacitive load is connected to the normally closed terminal of the corresponding switch unit, and the other terminal of the capacitive load is connected to the output terminal of the motor driver or the normally closed terminal of another switch unit.

Figure 9:
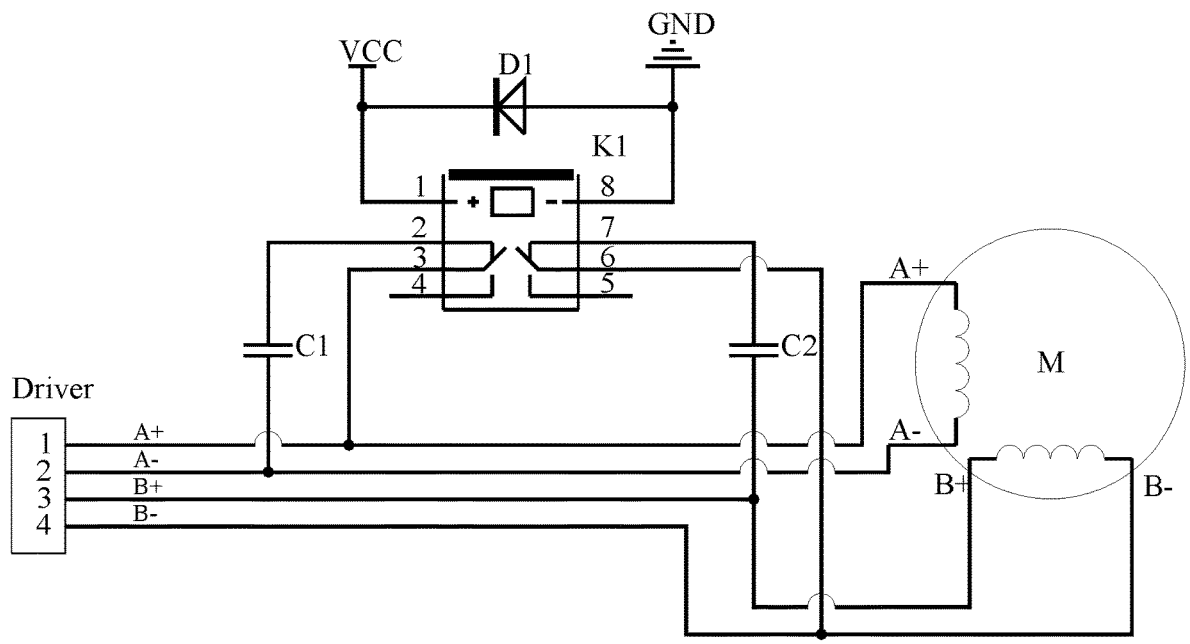
FIG. 9 is a ninth schematic circuit diagram of a motor assembly for slowing down a falling speed of a stage light fixture on power failure according to the present disclosure.
Figure 10:
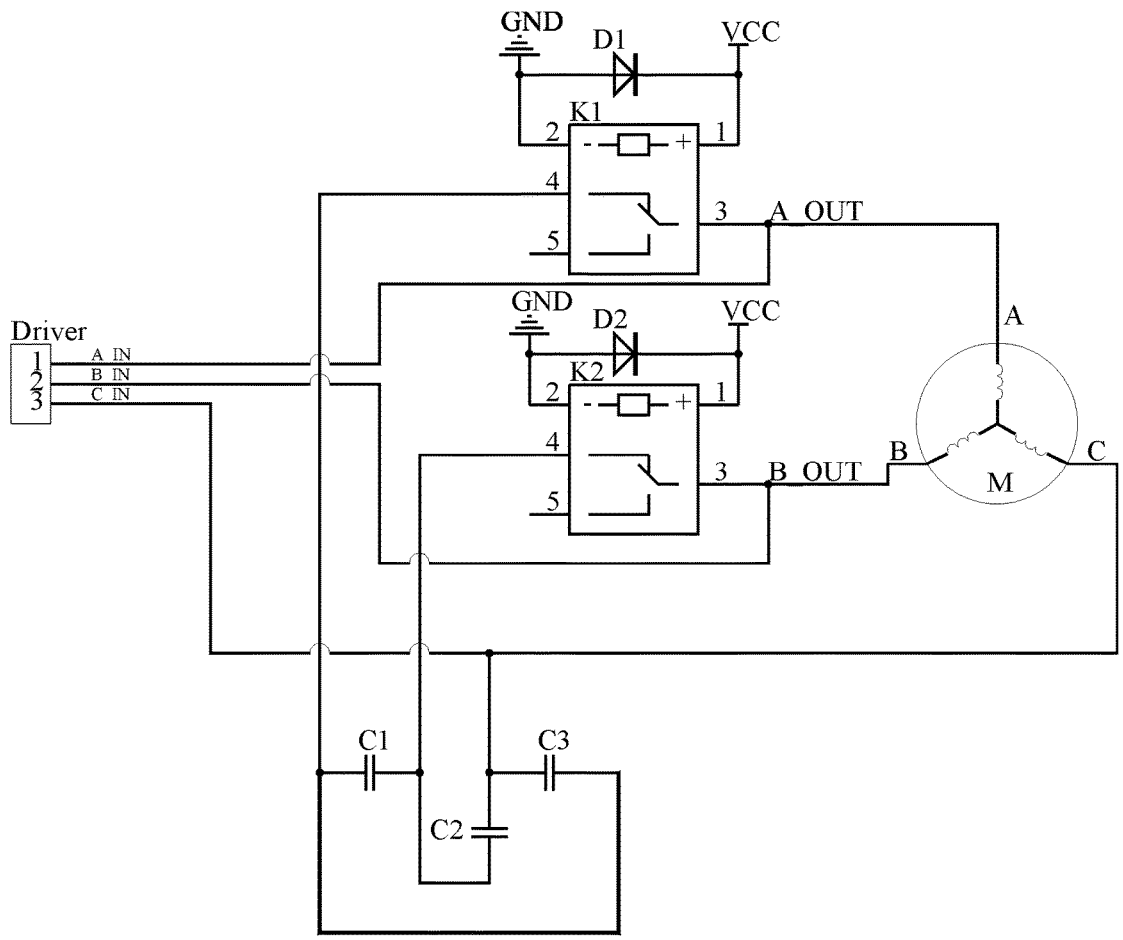
FIG. 10 is a tenth schematic circuit diagram of a motor assembly for slowing down a falling speed of a stage light fixture on power failure according to the present disclosure.

It should be noted that in this connection mode, when the automatic transfer switch is deenergized, one terminal of the windings is switched from the driver to the capacitive load, and the other terminal remains connected to the driver and the capacitive load at the same time, as illustrated in FIGS. 9 and 10.

Referring to FIG. 9, the motor assembly is a two-phase motor assembly in this embodiment. The two-phase motor assembly includes a motor driver, one automatic transfer switch, two capacitive loads, and a two-phase motor. It should be noted that in this embodiment, the automatic transfer switch includes two switch units. Therefore, the two-phase motor assembly according to this embodiment includes a motor driver, two switch units, two capacitive loads, and a two-phase motor. Each terminal of the motor driver is connected to one terminal of one of the windings and connected to the common terminal of one of the two switch units, the normally closed terminals of the corresponding switch units are respectively connected to two terminals of the two capacitive loads, and the other terminals of the two capacitive loads are respectively connected to two output terminals of the motor driver.

It may be thus understood that the two-phase stepper motor assembly in this embodiment includes a motor driver, referred as Driver, two switch units in an automatic transfer switch K1, two capacitive loads (a capacitive load C1 and a capacitive load C2), and a two-phase motor M.

A normally closed terminal 2 of one of the two switch units in the automatic transfer switch K1 is connected to one terminal of the capacitive load C1, the other terminal of the capacitive load C1 is connected to a terminal A− of the motor driver, referred as Driver, and the terminal A− of the motor driver, referred as Driver is also connected to a terminal A− of the windings of the two-phase motor M. A normally closed terminal 7 of one of the two switch units in the automatic transfer switch K1 is connected to one terminal of the capacitive load C2, the other terminal of the capacitive load C2 is connected to a terminal B+ of the motor driver, referred as Driver, and the terminal B+ of the motor driver, referred as Driver is also connected to a terminal B+ of the windings of the two-phase motor M.

Further, a common terminal 3 of one of the two switch units in the automatic transfer switch K1 is connected to a terminal A+ of the winding of the two-phase motor M, and a common terminal 6 of one of the two switch units in the automatic transfer switch K1 is connected to a terminal B− of the winding of the two-phase motor M. A common terminal 3 of one of the two switch units in the automatic transfer switch K1 is further connected to a terminal A+ of the motor driver, referred as Driver, and a common terminal 3 of the other of the two switch units in the automatic transfer switch K1 is further connected to a terminal B− of the motor driver, referred as Driver.

It should be noted that FIG. 9 illustrates only one of the connection methods, and this embodiment has a total of four connection methods, which are not listed here.

When the motor is in normal operation, the windings of the two switch units in the automatic transfer switch K1 are conducted and pulled-in, and the two switch units in the automatic transfer switch K1 are normally opened. In this case, output signals (a terminal A+ and a terminal B−) of the motor driver, referred as Driver are connected to two terminals (a terminal A+ and a terminal B−) of the two-phase motor M via the common terminals of the two switch units in the automatic transfer switch K1. In this case, the two-phase motor M operates according to the drive signals.

When the light fixture is subjected to a power failure, the windings of the two switch units in the automatic transfer switch K1 are disconnected, and the two switch units in the automatic transfer switch K1 are normally closed. In this way, the terminals A+, A−, B+, and B− of the windings of the two-phase motor M are connected to two terminals of the capacitive load C1 and two terminals the capacitive load C2 via the normally closed terminals of the two switch units in the automatic transfer switch K1.

The components fall under gravity to drive the two-phase motor M to rotate. The induced electromotive force generated by the rotation of the two-phase motor M is an alternating current. The capacitive load has an alternating current isolation effect. The windings of the two-phase motor M are capable of generating an induced current, such that the two-phase motor M generates an electromagnetic torque with a braking effect.

Referring to FIG. 10, the motor assembly is a three-phase motor assembly in this embodiment. The three-phase motor assembly includes a motor driver, two automatic transfer switches, three capacitive loads, and a three-phase motor. It should be noted that in this embodiment, each of the two automatic transfer switches includes a switch unit. Therefore, the three-phase motor assembly according to this embodiment includes a motor driver, two switch units, three capacitive loads, and a three-phase motor. Output terminals of the motor driver are connected to common terminals of the two switch units, the common terminals of the two switch units are further connected to two windings of the three-phase motor, totally six terminals of the three capacitive loads are connected in sequence in a ring pattern, normally closed terminals of the two switch units are respectively connected to two terminals of one of the three capacitive loads, and the remaining output terminal of the motor driver and the remaining winding of the three-phase motor are connected to the remaining terminal of the capacitive load. Alternatively, three terminals of the three capacitive loads are connected to each other in a radial pattern, the normally closed terminals of the two switch units are respectively connected to the other terminals of the two of the three capacitive loads, and the remaining output terminal and the remaining winding of the three-phase motor are connected to the other terminal of the remaining one of the three capacitive loads.

It may be thus understood that the three-phase stepper motor assembly in this embodiment includes a motor driver, referred as Driver, a switch unit in an automatic transfer switch K1, a switch unit in an automatic transfer switch K2, three capacitive loads (a capacitive load C1, a capacitive load C2, and a capacitive load C3), and a three-phase stepper motor M.

A terminal A-IN of the motor driver, referred as Driver is connected to a terminal A of the windings of the three-phase motor M and further connected to a common terminal 3 (A OUT) of the switch unit in the automatic transfer switch K1, a terminal B-IN of the motor driver, referred as Driver is connected to a terminal B of the windings of the three-phase motor M and further connected to a common terminal 3 (B OUT) of the switch unit in the automatic transfer switch K2, and a terminal C-IN of the motor driver, referred as Driver is connected to a terminal C of the windings of the three-phase motor M.

Further, a normally closed terminal 4 of the switch unit in the automatic transfer switch K1 and a normally closed terminal 4 of the switch unit in the automatic transfer switch K2 are connected to two terminals of the capacitive load C1, the normally closed terminal 4 of the switch unit in the automatic transfer switch K2 and the terminal C-IN of the motor driver, referred as Driver are connected to two terminals of the capacitive load C2, and the normally closed terminal 4 of the switch unit in the automatic transfer switch K1 and the terminal C-IN of the motor driver, referred as Driver are connected to two terminals of the capacitive load C3.

It may be thus understood that the normally closed terminal 4 of the switch unit in the automatic transfer switch K1 and the normally closed terminal 4 of the switch unit in the automatic transfer switch K2 are pairwise connected to two terminals of the capacitive load C1, the normally closed terminal 4 of the switch unit in the automatic transfer switch K2 and the terminal C-IN of the motor driver, referred as Driver are pairwise connected to two terminals of the capacitive load C2, and the normally closed terminal 4 of the switch unit in the automatic transfer switch K1 and the terminal C-IN of the motor driver, referred as Driver are pairwise connected to two terminals of the capacitive load C3.

It may be further understood that two terminals of the capacitive load C1, two terminals of the capacitive load C2, and two terminals of the capacitive load C3 are connected in sequence in a ring pattern, the normally closed terminal of the switch unit in the automatic transfer switch K1 and the normally closed terminal of the switch unit in the automatic transfer switch K2 are connected to two terminals of one of the three capacitive loads, and the remaining output terminal of the motor driver and the remaining winding of the three-phase motor are connected to totally four terminals of the remaining two of the three capacitive loads; or It may be alternatively understood that one terminal of the capacitive load C1, one terminal of the capacitive load C2, and one terminal of the capacitive load C3 are connected to each other in a radial pattern, the normally closed terminal of the switch unit in the automatic transfer switch K1 and the normally closed terminal of the switch unit in the automatic transfer switch K2 are respectively connected to the other terminals of two of the three capacitive loads, and the remaining output terminal of the motor driver and the remaining winding of the three-phase motor are connected to the other terminal of the remaining one of the three capacitive loads.

The circuit operation of the three-phase stepper motor assembly in this embodiment is the same as the circuit operation of the two-phase stepper motor assembly, which is thus not described herein any further.

It should be noted that any one of the 10 stepper motors (four two-phase stepper motors and six three-phase stepper motors) according to the above-mentioned embodiments is applicable to a scenario of a power failure of the stage light fixture, and any one of the 10 stepper motors is capable of reducing the falling speed of the stage light fixture in case of the power failure.

The motor assembly in these embodiments includes a motor driver, an automatic transfer switch, a capacitive load, and an alternating current motor. In the case that the automatic transfer switch is energized, windings of the alternating current motor are kept connected to the motor driver, and in the case that the automatic transfer switch is deenergized, the windings of the alternating current motor are switched to be connected to the capacitive load.

According to the above embodiments, in case of the power failure, two terminals of the windings are connected via a capacitive load, and the capacitive load makes the phase of the induced current 90° ahead of the phase of the induced voltage. The directions of the electromotive forces generated by the armature magnetic field of the motor and the primary magnetic field of the permanent magnet are thus consistent, and a longitudinal magnetization armature reaction may be generated. In this case, the magnetic flux increases, the induced voltage rises, the induced current rises, and the braking torque increases, thereby achieving to reduce the falling speed of the stage light fixture in case of the power failure.

A stage light fixture is further provided according to one embodiment of the present disclosure. The stage light fixture includes the motor assembly for reducing the falling speed of the stage light fixture on power failure.

Figure 11:
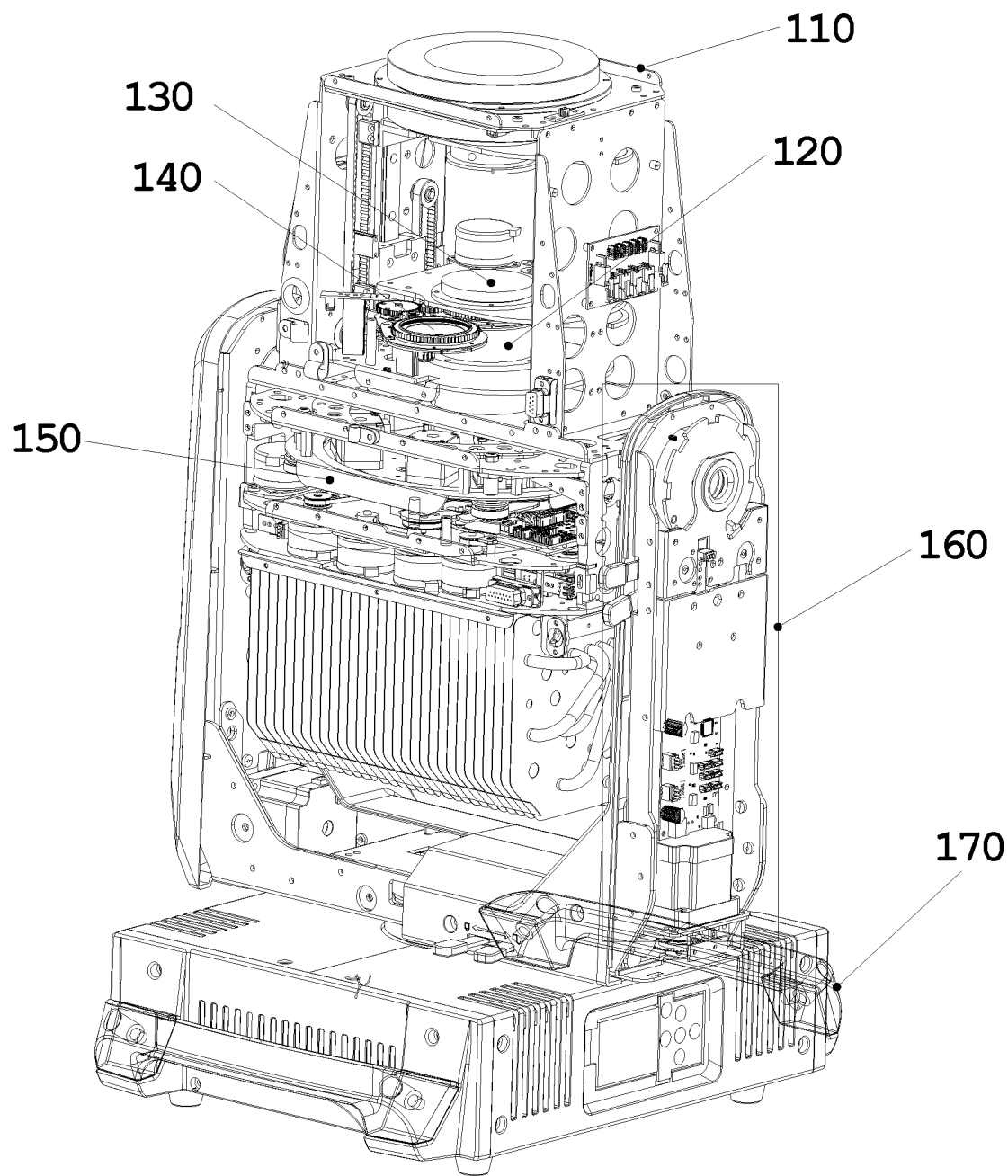
FIG. 11 is a schematic structural view of a stage light fixture according to the present disclosure.

As illustrated in FIG. 11, the stage light fixture includes a light head 110. The light head 110 is provided with a light source for generating a light beam, and an effect apparatus for intercepting the light beam to create a light effect. The motor assembly drives the effect apparatus to move along a light path or swing or rotate relative to the light path. One of the a focus lens 120 or a magnify lens 130 is movable with respect to the optical lens. One of a prism 140, an frosting lens, a fixed pattern wheel, a rotary pattern wheel, a color wheel, a fire wheel, an aperture, or a shader 150 is swingable or rotatable with respect to the optical path.

Further, the stage light fixture includes a support arm 160 for supporting rotation of the light head 110, and a case 170 configured for supporting rotation of the arm. The motor driver drives the light head 110 to rotate with respect to the support arm 160 and/or drives the support arm 160 to rotate with respect to the cabinet 170.

The motor assembly according to the present disclosure reduces the falling speed of the stage light fixture in case of the power failure. In this way, the impact force generated due to falling of the stage light fixture on power failure is reduced, and the components of the stage light fixture are thus better protected. In particular, a focus lens driven by a single stepper motor is provided, which lens is provided with a plurality of frosting and prism motors, and the overall weight thereof is relatively large. When driven by the single stepper motor, the lens may quickly fall when power failure, components short-circuited by the windings of the motor may also fall quickly, and the braking torque is insufficient. However, the motor assembly according to the present disclosure can slow down the falling speed of the stage light fixture on power failure, and the falling speed of the focus lens is effectively reduced.

Obviously, the above embodiments are merely exemplary ones for illustrating the present disclosure, but are not intended to limit the implementation of the present disclosure. Any modification, equivalent replacement, or improvement made without departing from the spirit and principle of the present disclosure should fall within the protection scope of the present disclosure.

What is claimed is:

1. A motor assembly for slowing down falling speed of a stage light fixture on power failure, comprising: a motor driver, an automatic transfer switch, a capacitive load, and an alternating current motor;
   wherein in the case that the automatic transfer switch is energized, windings of the alternating current motor are kept connected to the motor driver, and in the case that the automatic transfer switch is deenergized, the windings of the alternating current motor are switched to be connected to the capacitive load;
   wherein the automatic transfer switch comprises one or more switch units, each switch unit comprising a common terminal, a normally closed terminal, and a normally opened terminal, wherein the common terminal is connected to the windings of the alternating current motor, the normally closed terminal is connected to the capacitive load, and the normally opened terminal is connected to the motor driver; and wherein each winding of the alternating current motor corresponds to one capacitive load, each of two terminals of each of the windings of the alternating current motor is connected to the common terminal of one of the one or more switch units, the corresponding normally closed terminals of the respective switch unit are respectively connected to two terminals of the capacitive loads corresponding to the windings, and the corresponding normally opened terminals of the respective switch unit are respectively connected to terminals of the motor driver corresponding to the windings.

2. The motor assembly according to claim 1, wherein the motor assembly is a two-phase motor assembly, comprising a motor driver, four switch units, two capacitive loads, and a two-phase motor;
wherein common terminals of the four switch units are respectively connected to two terminals of two windings of the two-phase motor, normally closed terminals of two switch units of the four switch units connected to the same winding are respectively connected to two terminals of each of the two capacitive loads, and normally opened terminals of the two switch units connected to the same winding are connected to output terminals of the motor driver.

3. The motor assembly according to claim 1, wherein the motor assembly is a three-phase motor assembly, comprising a motor driver, three switch units, three capacitive loads, and a three-phase motor;
wherein output terminals of the motor driver are connected to normally opened terminals of the three switch units, and common terminals of the three switch units are respectively connected to three windings of the three-phase motor; and
wherein two terminals of each of three capacitive loads are connected in sequence in a ring pattern, and each pair of normally closed terminals of the three switch units is connected to two terminals of one of the three capacitive loads; or
wherein one terminal of each of three capacitive loads are connected to each other in a radial pattern, and each of normally closed terminals of the three switch units is connected to the other terminal of one of the three capacitive loads.

4. The motor assembly according to claim 1, wherein the automatic transfer switch is a relay or a semiconductor switch circuit.

5. The motor assembly according to claim 1, wherein a maximum charge amount storable in the capacitive load is greater than or equal to a charge amount generated by the alternating current motor in a power cycle.

6. The motor assembly according to claim 1, wherein the capacitive load is a non-polar capacitor.

7. The motor assembly according to claim 1, wherein a capacitance of the capacitive load is greater than or equal to 40 µF.

8. A stage light fixture, comprising a light head and the motor assembly for slowing down falling speed of the stage light fixture on power failure as defined in claim 1, wherein the light head is provided with a light source for generating a light beam and an effect apparatus for generating a light effect by intercepting the light beam, and the motor assembly is configured to drive the effect apparatus to move along a light path or swing or rotate relative to the light path.

9. A motor assembly for slowing down falling speed of a stage light fixture on power failure, comprising: a motor driver, an automatic transfer switch, a capacitive load, and an alternating current motor;
wherein in the case that the automatic transfer switch is energized, windings of the alternating current motor are kept connected to the motor driver, and in the case that the automatic transfer switch is deenergized, the windings of the alternating current motor are switched to be connected to the capacitive load;
wherein the automatic transfer switch comprises one or more switch units, each switch unit comprising a common terminal, a normally closed terminal, and a normally opened terminal, wherein the common terminal is connected to the windings of the alternating current motor, the normally closed terminal is connected to the capacitive load, and the normally opened terminal is connected to the motor driver; and
wherein each winding of the alternating current motor corresponds to one capacitive load, one terminal of at least one of the windings of the alternating current motor is directly connected to one corresponding terminal of the motor driver and one corresponding terminal of the capacitive load, and the other terminal of the at least one of the windings of the alternating current motor is connected to the common terminal of the corresponding switch unit, the normally closed terminal of the corresponding switch unit is connected to the other terminal of the capacitor load corresponding to the winding, and the normally opened terminal of the corresponding switch unit is connected to another terminal of the motor driver corresponding to the winding.

10. The motor assembly according to claim 9, wherein the motor assembly is a two-phase motor assembly, comprising a motor driver, two switch units, two capacitive loads, and a two-phase motor;
wherein one terminal of the motor driver for each phase of the two-phase motor is connected to one terminal of one of the windings and one terminal of one of the two capacitive loads, the other terminal of the motor driver is connected to a normally opened terminal of one of the two switch units, a common terminal of the corresponding switch unit is connected to the other terminal of the winding, and a normally closed terminal of the corresponding switch unit is connected to the other terminal of the capacitive load.

11. The motor assembly according to claim 9, wherein the motor assembly is a three-phase motor assembly, comprising a motor driver, two switch units, three capacitive loads, and a three-phase motor;
wherein two output terminals of the motor driver are connected to normally opened terminals of the two switch units, and common terminals of the two switch units are respectively connected to two windings of the three-phase motor; and
wherein two terminals of each of three capacitive loads are connected in sequence in a ring pattern, normally closed terminals of the two switch units are connected to two terminals of one of the three capacitive loads, and the remaining output terminal of the motor driver and the remaining winding of the three-phase motor are connected to one terminal of the remaining two of the three capacitive loads; or
wherein one terminal of each of the three capacitive loads are connected to each other in a radial pattern, normally closed terminals of the two switch units are respectively connected to the other terminals of two of the three capacitive loads, and the remaining output terminal of the motor driver and the remaining winding of the three-phase motor are connected the other terminal of the remaining one of the three capacitive loads.

12. A stage light fixture, comprising a light head and the motor assembly for slowing down falling speed of the stage light fixture on power failure as defined in claim 9, wherein the light head is provided with a light source for generating a light beam and an effect apparatus for generating a light effect by intercepting the light beam, and the motor assembly is configured to drive the effect apparatus to move along a light path or swing or rotate relative to the light path.

13. A motor assembly for slowing down falling speed of a stage light fixture on power failure, comprising: a motor driver, an automatic transfer switch, a capacitive load, and an alternating current motor;
   wherein in the case that the automatic transfer switch is energized, windings of the alternating current motor are kept connected to the motor driver, and in the case that the automatic transfer switch is deenergized, the windings of the alternating current motor are switched to be connected to the capacitive load; and
   wherein the automatic transfer switch comprises one or more switch units, each switch unit comprising a common terminal and a normally closed terminal, wherein the windings of the alternating current motor are directly connected to corresponding terminals of the motor driver and further connected to the common terminal of the respective switch unit, and the normally closed terminal of the respective switch unit is connected to the capacitive load.

14. The motor assembly according to claim 13, wherein two terminals of each of the windings of the alternating current motor are respectively connected to corresponding terminals of the motor driver and further connected to the common terminal of one of the switch units, and the normally closed terminal of the switch unit is connected to two terminals of the capacitive load corresponding to the winding.

15. The motor assembly according to claim 14, wherein the motor assembly is a two-phase motor assembly, comprising a motor driver, four switch units, two capacitive loads, and a two-phase motor; wherein four terminals of two windings of the two-phase motor are respectively connected to two output terminals of the motor driver corresponding to the windings and further connected to common terminals of the four switch units, and normally closed terminals of two switch units connected to the same winding are respectively connected to two terminals of one of the capacitive loads.

16. The motor assembly according to claim 14, wherein the motor assembly is a three-phase motor assembly, comprising a motor driver, three switch units, three capacitive loads, and a three-phase motor;
   wherein three windings of the three-phase motor are connected to an output terminal of the motor driver corresponding to the windings and further connected to common terminals of the three switch units; and
   wherein two terminals of each of the three capacitive loads are connected in sequence in a ring pattern, and each pair of normally closed terminals of the three switch units is connected to two terminals of one of the three capacitive loads; or
   wherein one terminal of each of the three capacitive loads are connected to each other in a radial pattern, and each of normally closed terminals of the three switch units is connected to the other terminal of one of the three capacitive loads.

17. The motor assembly according to claim 13, wherein one terminal of at least one of the windings of the alternating current motor is connected to an output terminal of the motor driver and further connected to the common terminal of a corresponding switch unit, one terminal of the capacitive load is connected to the normally closed terminal of the switch unit, and the other terminal of the capacitive load is connected to the output terminal of the motor driver or the normally closed terminal of another switch unit.

18. The motor assembly according to claim 17, wherein the motor assembly is a two-phase motor assembly, comprising a motor driver, two switch units, two capacitive loads, and a two-phase motor;
   wherein one terminal of the motor driver is connected to one terminal of one of the windings and connected to the common terminal of one of the two switch units, the normally closed terminals of the switch units are respectively connected to two terminals of the two capacitive loads, and the other terminals of the two capacitive loads are respectively connected to two output terminals of the motor driver.

19. The motor assembly according to claim 17, wherein the motor assembly is a three-phase motor assembly, comprising a motor driver, two switch units, three capacitive loads, and a three-phase motor;
   wherein two output terminals of the motor driver are respectively connected to two windings of the three-phase motor and connected to common terminals of the two switch units, two terminals of each of the three capacitive loads are connected in sequence in a ring pattern, two normally closed terminals of the two switch units are respectively connected to two terminals of one of the three load capacitive loads, and the remaining output terminal of the motor driver and the remaining winding of the three-phase motor are connected to one terminal of the remaining two of the three capacitive loads; or
   wherein one terminal of each of the three capacitive loads are connected to each other in a radial pattern, normally closed terminals of the two switch units are respectively connected to the other terminals of two of the three capacitive loads, and the remaining output terminal of the motor driver and the remaining winding of the three-phase motor are connected the other terminal of the remaining one of the three capacitive loads.

20. A stage light fixture, comprising a light head and the motor assembly for slowing down falling speed of the stage light fixture on power failure as defined in claim 13, wherein the light head is provided with a light source for generating a light beam and an effect apparatus for generating a light effect by intercepting the light beam, and the motor assembly is configured to drive the effect apparatus to move along a light path or swing or rotate relative to the light path.

* * * * *